United States Patent
Landman

(10) Patent No.: US 12,069,127 B2
(45) Date of Patent: *Aug. 20, 2024

(54) PEER-TO-PEER (P2P) DOWNLOADING

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,520

(22) Filed: May 19, 2023

(65) Prior Publication Data

US 2023/0362241 A1 Nov. 9, 2023

Related U.S. Application Data

(63) Continuation of application No. 16/795,195, filed on Feb. 19, 2020, now Pat. No. 11,695,829.

(60) Provisional application No. 62/959,014, filed on Jan. 9, 2020.

(51) Int. Cl.
H04L 67/1074 (2022.01)
H04L 9/32 (2006.01)

(52) U.S. Cl.
CPC ........ H04L 67/1074 (2013.01); H04L 9/3263 (2013.01)

(58) Field of Classification Search
CPC .......................... H04L 67/1074; H04L 9/3263
See application file for complete search history.

(56) References Cited

U.S. PATENT DOCUMENTS

| | | | |
|---|---|---|---|
| 5,671,282 | A | 9/1997 | Wolff et al. |
| 5,915,238 | A | 6/1999 | Tjaden |
| 5,931,946 | A | 8/1999 | Terada et al. |
| 6,604,236 | B1 | 8/2003 | Draper et al. |
| 7,007,042 | B2 | 2/2006 | Lubbers et al. |
| 7,403,901 | B1 | 7/2008 | Carley et al. |
| 7,814,146 | B2 | 10/2010 | Chavez et al. |
| 7,987,368 | B2 | 7/2011 | Zhu et al. |
| 8,036,140 | B2 | 10/2011 | Rao et al. |
| 8,196,186 | B2 | 6/2012 | Mityagin et al. |

(Continued)

FOREIGN PATENT DOCUMENTS

WO WO-2012153173 A2 11/2012

OTHER PUBLICATIONS

Patent Cooperation Treaty, International Search Report and Written Opinion issued for PCT Application No. PCT/IB2020/056777, dated Oct. 19, 2020, 15 pages.

(Continued)

*Primary Examiner* — Jerry B Dennison
(74) *Attorney, Agent, or Firm* — Norton Rose Fulbright US LLP

(57) ABSTRACT

The present disclosure provides a method, system, and device for peer-to-peer downloading across a network. To illustrate, a server may receive a request from a peer device for at least a portion of a file. The server may send, to the peer device, download information including a checksum corresponding to the portion of the file, a token corresponding to authorization for the peer device to perform P2P communication, an indicator that identifies at least one device that includes the portion of the file, or a combination thereof. The server may update tracking information to indicate that the peer device received the portion of the file.

20 Claims, 8 Drawing Sheets

(56) References Cited

U.S. PATENT DOCUMENTS

| | | | |
|---|---|---|---|
| 8,239,446 B2 | 8/2012 | Navar et al. | |
| 8,364,758 B2 | 1/2013 | Hydrie et al. | |
| 8,413,198 B2 | 4/2013 | Connor et al. | |
| 9,053,124 B1 | 6/2015 | Dornquast et al. | |
| 9,280,339 B1 | 3/2016 | Prunicki et al. | |
| 9,635,107 B2 | 4/2017 | Souza et al. | |
| 9,659,155 B2 | 5/2017 | Kosovan | |
| 9,819,665 B1 | 11/2017 | Machani | |
| 9,842,062 B2 | 12/2017 | Ford et al. | |
| 9,959,394 B2 | 5/2018 | Vlot et al. | |
| 10,043,026 B1 | 8/2018 | Salour et al. | |
| 10,091,215 B1 | 10/2018 | Word | |
| 10,339,299 B1 | 7/2019 | Magnuson et al. | |
| 10,387,570 B2 | 8/2019 | VanBlon et al. | |
| 10,409,838 B1 | 9/2019 | George et al. | |
| 10,701,143 B1 | 6/2020 | Jha et al. | |
| 10,719,369 B1 | 7/2020 | Aithal et al. | |
| 10,754,952 B2 | 8/2020 | Muller et al. | |
| 10,785,334 B2 | 9/2020 | Kristiansson et al. | |
| 10,812,975 B1 | 10/2020 | Easwar Prasad et al. | |
| 10,880,407 B2 | 12/2020 | Reynolds et al. | |
| 10,911,337 B1 | 2/2021 | De Kosnik et al. | |
| 10,986,387 B1 | 4/2021 | Parulkar et al. | |
| 11,048,590 B1 | 6/2021 | Sapuntzakis et al. | |
| 11,064,323 B2 | 7/2021 | Esselink et al. | |
| 11,284,258 B1 | 3/2022 | Wei et al. | |
| 2002/0062439 A1 | 5/2002 | Cotugno et al. | |
| 2002/0156893 A1 | 10/2002 | Pouyoul et al. | |
| 2003/0191955 A1 | 10/2003 | Wagner et al. | |
| 2003/0220880 A1 | 11/2003 | Lao et al. | |
| 2004/0181561 A1 | 9/2004 | Knox et al. | |
| 2004/0250115 A1 | 12/2004 | Gemmel et al. | |
| 2005/0132348 A1 | 6/2005 | Meulemans et al. | |
| 2006/0107286 A1 | 5/2006 | Connor et al. | |
| 2006/0195816 A1 | 8/2006 | Grandcolas et al. | |
| 2007/0220575 A1 | 9/2007 | Cooper et al. | |
| 2007/0294686 A1 | 12/2007 | Oh | |
| 2008/0005113 A1 | 1/2008 | Li | |
| 2008/0005120 A1 | 1/2008 | Li | |
| 2008/0082648 A1 | 4/2008 | Ahmed et al. | |
| 2008/0294860 A1 | 11/2008 | Stakutis et al. | |
| 2009/0013317 A1 | 1/2009 | Abfalter et al. | |
| 2009/0083812 A1 | 3/2009 | Tang | |
| 2009/0119655 A1 | 5/2009 | Quilty | |
| 2009/0144340 A1 | 6/2009 | Ferguson et al. | |
| 2009/0210697 A1 | 8/2009 | Chen et al. | |
| 2009/0290715 A1 | 11/2009 | Mityagin et al. | |
| 2009/0313353 A1 | 12/2009 | Lou | |
| 2010/0217694 A1 | 8/2010 | Knighton | |
| 2010/0223472 A1 | 9/2010 | Alvarsson | |
| 2010/0287363 A1 | 11/2010 | Thorsen | |
| 2011/0010258 A1 | 1/2011 | Chavez et al. | |
| 2011/0010421 A1 | 1/2011 | Chavez et al. | |
| 2011/0071841 A1* | 3/2011 | Fomenko | H04L 63/10 705/1.1 |
| 2011/0072075 A1 | 3/2011 | Gautier | |
| 2011/0107419 A1 | 5/2011 | Vidal et al. | |
| 2011/0113012 A1 | 5/2011 | Gruhl et al. | |
| 2011/0225311 A1 | 9/2011 | Liu et al. | |
| 2011/0307564 A1 | 12/2011 | Luo et al. | |
| 2012/0131566 A1 | 5/2012 | Morgan et al. | |
| 2012/0151051 A1 | 6/2012 | Zhang et al. | |
| 2012/0151245 A1 | 6/2012 | Chang et al. | |
| 2012/0159469 A1 | 6/2012 | Laor | |
| 2012/0233134 A1 | 9/2012 | Barton et al. | |
| 2012/0240096 A1 | 9/2012 | Sass | |
| 2012/0259920 A1 | 10/2012 | Mathieu et al. | |
| 2012/0297405 A1 | 11/2012 | Zhang et al. | |
| 2013/0073727 A1 | 3/2013 | Souza et al. | |
| 2013/0081100 A1 | 3/2013 | Sreehari et al. | |
| 2013/0124807 A1 | 5/2013 | Nielsen et al. | |
| 2013/0132946 A1 | 5/2013 | Ma | |
| 2013/0268927 A1 | 10/2013 | Cochran | |
| 2014/0172972 A1 | 6/2014 | Burba et al. | |
| 2014/0173024 A1 | 6/2014 | Burba et al. | |
| 2014/0245376 A1 | 8/2014 | Hibbert et al. | |
| 2015/0003296 A1 | 1/2015 | Fan et al. | |
| 2015/0088992 A1 | 3/2015 | Ioannidis et al. | |
| 2015/0099510 A1 | 4/2015 | Shah et al. | |
| 2015/0172352 A1 | 6/2015 | Gopalakrishnan et al. | |
| 2015/0268881 A1 | 9/2015 | Nielsen et al. | |
| 2015/0301823 A1 | 10/2015 | Hatakeyama | |
| 2015/0302037 A1 | 10/2015 | Jackson et al. | |
| 2015/0312243 A1 | 10/2015 | Ponsford et al. | |
| 2015/0317145 A1 | 11/2015 | Katariya et al. | |
| 2015/0341178 A1 | 11/2015 | Tanaka et al. | |
| 2015/0341325 A1 | 11/2015 | Al Jabri | |
| 2015/0350186 A1 | 12/2015 | Chan et al. | |
| 2016/0006837 A1 | 1/2016 | Reynolds et al. | |
| 2016/0117235 A1 | 4/2016 | Mishra et al. | |
| 2016/0124665 A1 | 5/2016 | Jain et al. | |
| 2016/0164900 A1 | 6/2016 | Pericin | |
| 2016/0179867 A1 | 6/2016 | Li et al. | |
| 2016/0182494 A1 | 6/2016 | Lissounov et al. | |
| 2016/0234237 A1 | 8/2016 | Thakar et al. | |
| 2016/0266890 A1 | 9/2016 | Aleksandrov et al. | |
| 2016/0267101 A1 | 9/2016 | Clissold et al. | |
| 2016/0373440 A1 | 12/2016 | Mather et al. | |
| 2017/0003951 A1 | 1/2017 | Newell et al. | |
| 2017/0034023 A1 | 2/2017 | Nickolov et al. | |
| 2017/0060546 A1 | 3/2017 | Prasad et al. | |
| 2017/0147338 A1 | 5/2017 | Jackson et al. | |
| 2017/0262657 A1 | 9/2017 | Salmon-Legagneur et al. | |
| 2017/0264588 A1 | 9/2017 | Hunt et al. | |
| 2017/0300309 A1 | 10/2017 | Berger et al. | |
| 2017/0371499 A1 | 12/2017 | Checkley et al. | |
| 2018/0095993 A1 | 4/2018 | Clark | |
| 2018/0189043 A1 | 7/2018 | Habayeb | |
| 2018/0240546 A1 | 8/2018 | Pfeiffer | |
| 2018/0260212 A1 | 9/2018 | Wisnovsky | |
| 2018/0373517 A1 | 12/2018 | Hu | |
| 2019/0014161 A1 | 1/2019 | Doar et al. | |
| 2019/0050576 A1 | 2/2019 | Boulton | |
| 2019/0080080 A1 | 3/2019 | Ogura et al. | |
| 2019/0130114 A1 | 5/2019 | Smith et al. | |
| 2019/0138287 A1 | 5/2019 | De Capoa et al. | |
| 2019/0205121 A1 | 7/2019 | Ericson | |
| 2019/0303623 A1 | 10/2019 | Reddy et al. | |
| 2019/0306173 A1 | 10/2019 | Reddy et al. | |
| 2019/0332367 A1 | 10/2019 | Navarrete Michelini et al. | |
| 2019/0379723 A1 | 12/2019 | Demasi et al. | |
| 2020/0012441 A1 | 1/2020 | Chheda et al. | |
| 2020/0026857 A1 | 1/2020 | Muller et al. | |
| 2020/0076618 A1 | 3/2020 | Driever et al. | |
| 2020/0076807 A1 | 3/2020 | Driever et al. | |
| 2020/0084202 A1 | 3/2020 | Smith et al. | |
| 2020/0162543 A1 | 5/2020 | Mosko et al. | |
| 2020/0177397 A1 | 6/2020 | Harrington | |
| 2020/0186505 A1 | 6/2020 | Amar et al. | |
| 2020/0213144 A1 | 7/2020 | Maloy | |
| 2020/0252207 A1 | 8/2020 | Hanel et al. | |
| 2020/0351089 A1 | 11/2020 | Wentz | |
| 2020/0372183 A1 | 11/2020 | Rangaiah et al. | |
| 2020/0409986 A1 | 12/2020 | Soroushian et al. | |
| 2020/0412691 A1 | 12/2020 | Shribman et al. | |
| 2021/0111875 A1 | 4/2021 | Le Saint | |
| 2021/0218800 A1 | 7/2021 | Landman | |
| 2022/0326944 A1 | 10/2022 | Khan et al. | |

OTHER PUBLICATIONS

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Patent Cooperation Treaty, International Search Report and Written Opinion issued for PCT Application No. PCT/IB2020/056776, dated Feb. 22, 2021, 10 pages.

(56) References Cited

OTHER PUBLICATIONS

Post, H. et al., "Linking Functional Requirements and Software Verification," 2009 17th IEEE International Requirements Engineering Conference, 2009, 8 pages.
Patent Cooperation Treaty, International Search Report and Written Opinion issued for PCT Application No. PCT/IB2021/050134, dated Mar. 4, 2021, 14 pages.
JFrog; "Access Tokens," https://www.jfrog.com/confluence/display/JCR6X/Access+Tokens, Jan. 29, 2020 (Year: 2020), 1 page.
Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.
Eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.
Alibaba Cloud; "Behind Alibaba's Double 11 Mysterious "Dragonfly" Technology ®C PB-Grade Large-File Distribution System," https://www.alibabacloud.com/blog/behind-alibabas-double-11-mysterious-dragonfly-technology-®c-pb-grade-large-file-distribution-system_594074, Oct. 15, 2018 (Year: 2018), 14 pages.
Seneviratne, AIDK; "Enabling an Authentication Mechanism for Docker Remote API," Mar. 2017 (Year: 2017), 70 pages.
IEEE; "FID: A Faster Image Distribution System for Docker Platform," 2017 (Year: 2017), 8 pages.
DragonFly; "What Is DragonFly?" https://web.archive.org/web/20190501065255/https://d7y.io/enus/docs/overview/what_is_dragonfly.html, May 1, 2019 (Year: 2019), 3 pages.
Uber Engineering Blog; "Introducing Kraken, an Open Source Peer-to-Peer Docker Registry," https://eng.uber.com/introducing-kraken/, May 5, 2019 (Year: 2019), 3 pages.
JFrog; "Searching for Artifacts," https://www.jfrog.com/confluence/display/JCR6X/Searching+for+Artifacts, Jan. 29, 2020 (Year: 2020), 3 pages.
Yoshida et al. "Understanding the Origins of Weak Cryptographic Algorithms Used for Signing Android Apps," 2018 $42^{nd}$ IEEE International Conference on Computer Software and Applications; 6 pages.

\* cited by examiner

"File" : "checksum"

Portion Info
{
"part1": "checksum",
"part2": "checksum",
"part3": "checksum",
"part4": "checksum"
}

| Peer Device | P1 | P2 | P3 | P4 | P5 | ... | Px |
|---|---|---|---|---|---|---|---|
| Peer_1 | 1 | 1 | 1 | 1 | 1 | ... | 1 |
| Peer_2 | 1 | 0 | 1 | 0 | 0 | ... | 0 |
| ... | ... | ... | ... | ... | ... | ... | ... |
| Peer_n | 0 | 0 | 0 | 0 | 0 | ... | 1 |

PEER INFORMATION 410
File Portions

PEER-TO-PEER (P2P) DOWNLOADING

CROSS-REFERENCE TO RELATED APPLICATIONS

The present application is a continuation of U.S. patent application Ser. No. 16/795,195 filed Feb. 19, 2020 and entitled "PEER-TO-PEER (P2P) DOWNLOADING"; and claims the benefit of U.S. Provisional Patent Application No. 62/959,014 filed Jan. 9, 2020 and entitled "PEER-TO-PEER (P2P) DOWNLOADING"; and is related to U.S. patent application Ser. No. 16/399,905 filed Apr. 30, 2019 and issued Jul. 12, 2022 as U.S. Pat. No. 11,386,233 entitled "DATA BUNDLE GENERATION AND DEPLOYMENT"; to co-pending U.S. patent application Ser. No. 16/399,938 filed Apr. 30, 2019 entitled "DATA FILE PARTITION AND REPLICATION"; and to U.S. patent application Ser. No. 16/399,953 filed Apr. 30, 2019 and issued May 24, 2022 as U.S. Pat. No. 11,340,894 entitled "DATA FILE PARTITION AND REPLICATION", the disclosures of which are incorporated by reference herein in their entirety.

TECHNICAL FIELD

The present application is generally related to the technical field of software downloading, and more particularly, but not by way of limitation, to techniques for peer-to-peer (P2P) downloading.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues.

To deploy file or software, a memory device including the new version of the software can be physically connected and uploaded to a target device. Deploying a file or software in such a manner can be time consuming, resource (e.g., personnel) intensive, and is impractical for software to be deployed to multiple locations or for service-oriented architecture that may require multiple updates for different pieces of software at different times. Alternatively, a file or software can be deployed via one or more networks. However, deployment of a file or software via a network presents its own challenges. For example, a device to receive the file or the software needs to be connected to the network and maintain a sufficient network connection to receive the entire version of the file or the software. As another example, the network itself must have sufficient bandwidth and acceptable latencies to enable the file or the software to be deployed. Additionally, the file or the software typically needs to be deployed in a secure manner so that unauthorized updates and/or deployments are avoided. In some circumstances, deployment of files or software may also need to be accessible to an endpoint device and require authorization.

Additional complications may manifest when a file or software is to be provided to multiple devices. For example, when the file or the software is provided by a server to the multiple devices, network congestion and/or overload may occur and create network flooding. In such situations, one or more retries, and thus delays, may be required to complete transmission of the file or software to the multiple devices.

As an alternative to providing the file or the software from a server, a peer-to-peer (P2P) protocol may be used to provide the file or software to the multiple devices. However, use of a P2P protocol includes its own challenges. For example, P2P protocols may have difficulty controlling bandwidth between peer devices, can lack secure communication, and can lack authentication and authorization prior to download. As another example, P2P protocols may rely on P2P information exchange to identify devices with and/or without the file or software, which can be a time consuming process to identify a device with the file or software. Thus, deploying a file or software efficiently, consistently, and securely has many difficult challenges when deployed by a server or using a P2P protocol.

BRIEF SUMMARY

Embodiments of the present disclosure provide systems, methods, and computer-readable storage media that provide for peer-to-peer (P2P) downloading via a network. For example, as described herein, a server may play an active role in P2P transfer of a file. To illustrate, the server may coordinate file transfer (e.g., file downloading) between one or more peer devices related to the server. Each of the one or more peer devices may be registered with the server. The server may determine or track an availability of one or portion portions of a file at one or more peer devices (e.g., multiple peer devices). In some such implementations, the server may issue at least one peer device a signed certificate to enable authorized and/or trusted P2P communication between two or more peer devices. The signed certificate may be used to enable encryption of P2P (e.g., inter-peer) communications, such as communications encrypted with Transport Layer Security (TLS).

To coordinate file transfer (e.g., file downloading) between one or more peer devices, the server may receive a download request from a peer device. The download request may correspond to at least a portion of a file, such as at least a portion of a binary. Based on r the download request, the server may generate and/or send download information to the requesting peer device. In some implementations, the download information may include metadata, such as a checksum for each portion of multiple portions of a file and a checksum for the file. Additionally, or alternatively, based on the download request, the server may generate and/or send an authorization indicator, such as a token, to the requesting peer device. The authorization indicator may indicate a time period, such as a renewable time period, during which the requesting peer device may engage in P2P communication(s) re receive at least the portion of the file. In implementations where the authorization indicator is renewable, the authorization indicator may be renewable by the server such that the server controls and/or has an opportunity to control or stop a P2P download process initiated by the requesting peer device.

In some implementations, the server may receive, from the requesting peer device, a request for identification of one or more devices (e.g., the server and/or one or more peer devices) that include at least the portion of the file. In response to receiving the request, the server may check on or more permissions or licenses to confirm that the requesting peer device is authorized to receive the portion of the file. The request for identification may be include in, implied by, or separate from the download request. Based on the request for identification, the server may send peer information to the requesting peer device.

In some implementations, the server may provide an indication of devices available and/or permitted for peer sharing. For example, the peer information may include or indicate peer devices from which the requesting device may receive at least the portion of the file. To illustrate, for particular peer device, the peer information may include a bitmap that indicates portions of the file that the particular peer device includes, does not include, or a combination thereof.

The peer device (e.g., the requesting peer device) may establish communication with one or more peer devices and request at least the portion of the file from the one or more peer devices. For example, the peer device may establish the connection using Hypertext Transfer Protocol Secure (HTTP/S). The peer device may request the portion based on the download information, the peer information, or both. Additionally, or alternatively, the peer device may request the portion of the file from the server. In some implementations, the peer device may prioritize which portion of the file to obtain from another device. For example, the peer device may prioritize a portion based on its availability (e.g., its rarity) from other devices, which may then increase the availability for other devices once the peer devices receive that portion. As another example, the peer device may prioritize a portion that is sequentially earlier than other portions so that the peer device can begin streaming the file as the portions are received. To illustrate, the peer device may divide a file into a plurality of portions and use a window, such as a sliding window, to enable the peer device to support streaming of the file as the peer device receives the portions. In some implementations, the peer device may receive one or more portions of a file in parallel from multiple other peer devices. The peer device may indicate to server as it receives one or more different portions, may periodically report received or missing portions, or may report after it has the file. Based on receiving a portion of the file, the peer device may confirm that the received portion is correct to avoid consuming or distributing bad or corrupted file portions. Additionally, or alternatively, after the peer devices receives multiple portions of the file, the peer device may confirm that it has received an entirety of the file.

As described herein, the server may receive, aggregate, and/or store the indications from the peer device and maintain an understanding of which peers include which portions of the file. The server may communicate with a requesting peer device to efficiently and securely initiate a P2P download of a requested file. By utilizing the P2P download, the requesting device may quickly receive one or more portions of a file for use by the peer device.

According to one embodiment, a method for managing peer-to-peer (P2P) downloading via a network is described. The method includes receiving, by a server, a request from a peer device for at least a portion of a file. The method also includes sending, by the server, download information to the peer device, the download information including a checksum corresponding to the portion of the file. The method further includes sending, by the server to the peer device, a token corresponding to authorization for the peer device to perform P2P communication. The method further includes sending, by the server to the peer device, an indicator that identifies at least one peer device that includes the portion of the file. It is noted that the server may also operate as a peer device—e.g., the server may operate in multiple modes. For example, the server may operate in an available mode (e.g., a highly available mode) in which the server is available to receive requests from one or more peer devices and/or to operate as a peer device. The method also includes updating, by the server, tracking information to indicate that the peer device received the portion of the file.

According to yet another embodiment, a system for managing peer-to-peer (P2P) downloading via a network is described. The system includes at least one memory storing instructions and one or more processors coupled to the at least one memory. The one or more processors are configured to execute the instructions to cause the one or more processors to receive a request from a peer device for at least a portion of a file. The one or more processors can further be configured to execute the instructions to cause the one or more processors to send download information to the peer device, the download information including a checksum corresponding to the portion of the file. The one or more processors are further configured to execute the instructions to cause the one or more processors to send, to the peer device, a token corresponding to authorization for the peer device to perform P2P communication. The one or more processors are further configured to execute the instructions to cause the one or more processors to end, to the peer device, an indicator that identifies at least one peer device that includes the portion of the file. The one or more processors are further configured to execute the instructions to cause the one or more processors to update tracking information to indicate that the peer device received the portion of the file.

According to another embodiment, a computer program product is described that includes a computer-readable storage device, such as a non-transitory computer-readable storage medium, that includes instructions that, when executed by one or more processors, cause the one or more processors to perform operations for managing peer-to-peer (P2P) downloading via a network. The operations include executing a first routine to receive a request from a peer device for at least a portion of a file. The operations further include executing a second routine to send download information to the peer device, the download information including a checksum corresponding to the portion of the file. The operations also include executing a third routine to send, to the peer device, a token corresponding to authorization for the peer device to perform P2P communication, executing a fourth routine to send, to the peer device, an indicator that identifies at least one peer device that includes the portion of the file, and executing a fifth routine to update tracking information to indicate that the peer device received the portion of the file.

According to another embodiment, a method for peer-to-peer (P2P) downloading via a network is described. The method includes receiving, by a peer device, a download command for a file, and sending, from the peer device to a server, a download request based on the download command. The method also includes receiving, at the peer device from the server, download information including a checksum corresponding to at least a portion of the file, and receiving, at the peer device from the server, an indicator that identifies at least one device that includes the portion of the file. The method further includes sending, from the peer device to the server, downloaded file information indicating that the peer device verified, based on the checksum, receipt of the portion of the file from the at least one device.

According to yet another embodiment, a system for peer-to-peer (P2P) downloading via a network is described. The system includes at least one memory storing instructions and one or more processors coupled to the at least one memory. The one or more processors are configured to execute the instructions to cause the one or more processors to receive a download command for a file, and send, to a server, a download request based on the download command. The one or more processors can further be configured to execute the instructions to cause the one or more processors to receive, from the server, download information including a checksum corresponding to at least a portion of the file, and receive, from the server, an indicator that identifies at least one device that includes the portion of the file. The one or more processors are further configured to execute the instructions to cause the one or more processors to send, to the server, downloaded file information indicating that the peer device verified, based on the checksum, receipt of the portion of the file from the at least one device.

According to another embodiment, a computer program product is described that includes a computer-readable storage device, such as a non-transitory computer-readable storage medium, that includes instructions that, when executed by one or more processors, cause the one or more processors to perform operations for peer-to-peer (P2P) downloading via a network. The operations include executing a first routine to receive a download command for a file. The operations further include executing a second routine to send, to a server, a download request based on the download command. The operations also include executing a third routine to receive, from the server, download information including a checksum corresponding to at least a portion of the file, executing a fourth routine to receive, from the server, an indicator that identifies at least one device that includes the portion of the file, and executing a fifth routine to send, to the server, downloaded file information indicating that the peer device verified, based on the checksum, receipt of the portion of the file from the at least one device.

The foregoing has outlined rather broadly the features and technical advantages of the present disclosure in order that the detailed description that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION OF THE INVENTION

Figure 1:
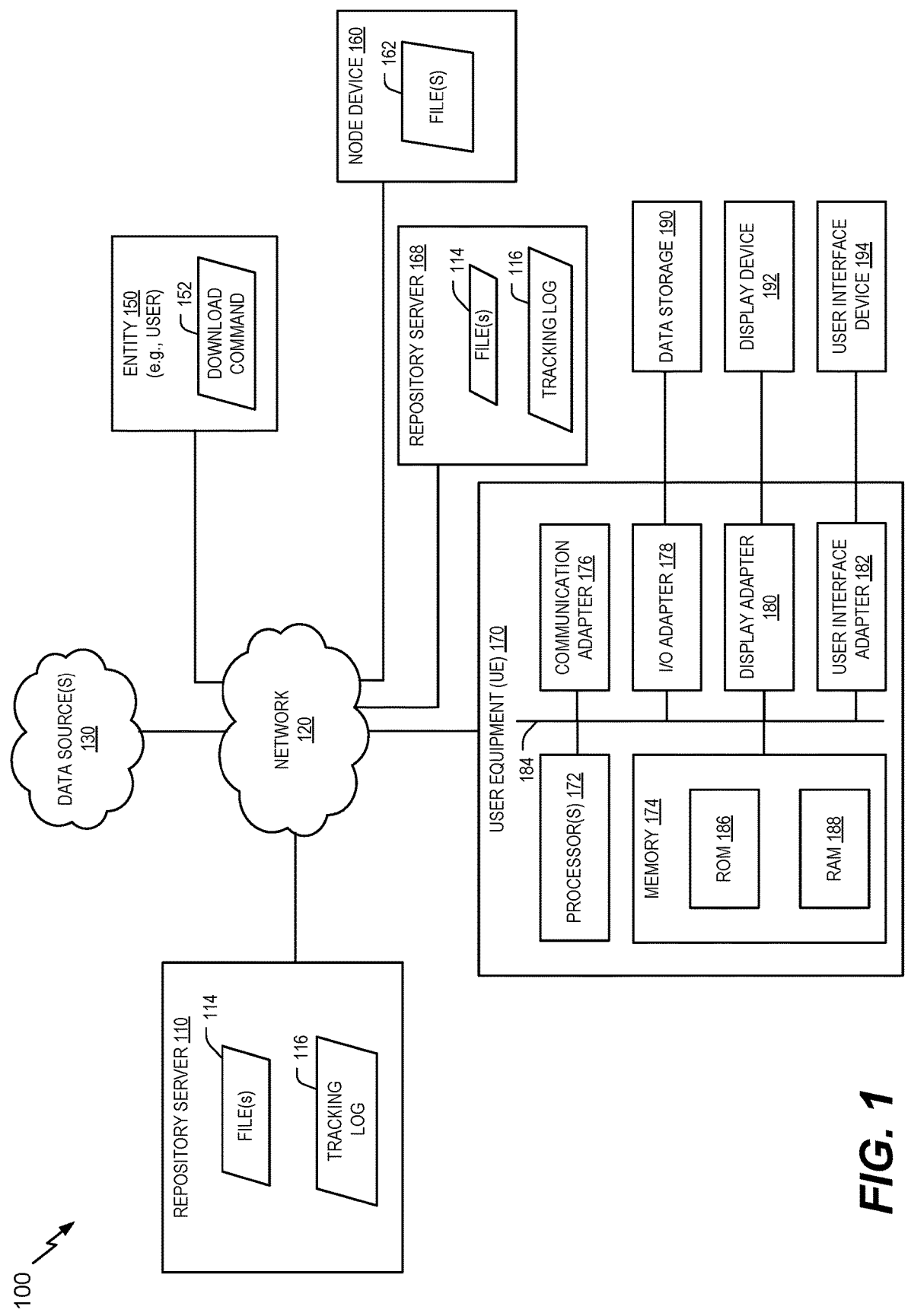
FIG. 1 is a block diagram of an example of a system that includes a server for peer-to-peer (P2P) downloading.

Inventive concepts utilize a system P2P deployment. To illustrate, one or more peer devices may register with a device, such as a sever, a management device, or a tracker, and receive a signed child certificate from the device. Each of the one or more registered peer devices may then listen for download requests from other registered peers. To illustrate, the signed child certificates may be communicated from the server to a peer device upon registration of the peer device with the server. Additionally, or alternatively, the signed child certificates may be communicated from one peer device to another peer device to authenticate that the peer device that send the signed child certificate is registered with the device. After a peer device is registered, the peer device may operate as both a requesting peer device and a providing peer device during P2P communication.

In some implementations, a peer device receives a download command for a file and proceeds to send a download request, based on the download command, to the server (e.g., a tracker module). Based on the download request, the server (e.g., the tracker module) verifies that the peer device has permission to request and/or receive the file. After a positive verification, the server (e.g., the tracker module) sends download information, a token, an indicator, or a combination thereof to the peer device. The download information may include a checksum corresponding to the portion of the file or an entirety of the file. The token corresponds to authorization for the peer device to perform P2P communication. The indicator identifies at least one peer device that includes the portion of the file. Based on the download information, the token, and the indicator, the peer device performs P2P communication to receive a portion the file from another device, such as another peer device. After verifying, based on the checksum, receipt of the portion of the file, the peer device notifies the server (e.g., the tracker module) and the server (e.g., the tracker module) updates tracking information to indicate that the peer device received the portion of the file.

Thus, the server (e.g., the tracker module) maintains tracking information regarding which peer devices include which portions of a file. The server (e.g., the tracker module) plays an active role to inform peer devices of the availability of different portions of a file from different peer devices. By playing an active role, the server (e.g., the tracker module) enables efficient and secure P2P downloads between peer devices and reduces network burden to and from the server (e.g., the tacker module).

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for managing P2P downloading is shown and designated 100. For example, the server may enable, coordinate, and track P2P downloading across a network. System 100 includes a server 110 (e.g., a first repository server), a network 120, data sources 130, an entity 150, a node device 160, a server 168 (e.g., a second repository server), and user equipment 170. Although shown as having two repository servers, in other implementations, system 100 may have a single repository server or more than two repository servers. Additionally, although shown as having a single node device (e.g., 160), in other implementations, system 100 may have a multiple node devices.

Server 110 may include one or more servers that, according to one implementation, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2 and 3A. One of skill in the art will readily recognize that different server and computer architectures can be utilized to implement server 110, and that server 110 is not limited to a particular architecture so long as the hardware implementing server 110 supports one or more functions of the repository system disclosed herein. As shown in FIG. 1, user equipment 170 can be used to enable an owner and/or administrator of repository server 110 to access and modify aspects (e.g., instructions, applications, data) of repository server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity 150, node device 160, and/or server 168.

As shown, server 110 includes one or more files 114 and, optionally, a tracking log 116. File(s) 114 may include one or more binaries (e.g., a computer file that is not a text file). File(s) 114 may correspond to one or more package types. For example, a first artifact may correspond to a first package type, such as Maven, and a second artifact may correspond to a second package type, such as Bower or Docker. Tracking log 116 may indicate which devices (e.g. nodes) have one or more files (e.g., one or more files 114), such as one or more portions of one or more files. For example, tracking log 116 may include internet protocol (IP) addresses of the node devices, path addresses of the node devices, uniform resource locators (URLs) corresponding to the node devices, device identifiers (e.g., media access control (MAC) addresses, etc.) of the node devices, or a combination thereof. Server 110 may be configured to update tracking log 116 each time receiving information from node devices. In some implementations, repository server 110 may include vulnerability information that indicates vulnerabilities with one or more of files 114. For example, the vulnerability information may include one or more checksums (indicating artifacts for which a risk is detected), license information associated with one or more artifacts, public keys that correspond to private keys used to affirm that a software release has successfully completed one or more stages of a development process, or a combination thereof.

Network 120, such as a communication network, may facilitate communication of data between server 110 and other components, servers/processors, and/or devices. For example, network 120 may also facilitate communication of data between server 110 and one or more data sources 130, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity 150 includes or is configured to generate (or initiate generation of) a download command 152. Download command 152 corresponds to one or more files (e.g., artifacts) to be provided to and/or stored at one or more node devices (e.g., 160). In some implementations, entity 150 provides download command 152 to server 110 to cause server 110 to initiate downloading of at least a portion of a file to the one or more node devices (e.g., 160). In other implementations, entity 150 provides a download command 152 to the one or more node devices (e.g., 160) and the one or more node devices (e.g., 160) communicate with server 110 based on the download command 152.

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

Node device 160 includes one or more files 162. To illustrate, software (e.g., packages), such as the one or more files 162, hosted at node device 160 may be part of a software release which is a secure and immutable collection of one or more artifacts that make up a software release. In some implementations, the release files 162 include or correspond to one or more download commands (e.g., 152) corresponding to node device 160. The files 162 stored at and/or executed by node device 160 may be tracked by repository server 110 using tracking log 116.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a digital music player, a portable music player, a video player, a digital video player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing file(s) 114. In some implementations, server 168 maintains tracking log 116.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can comprise a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can comprise one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
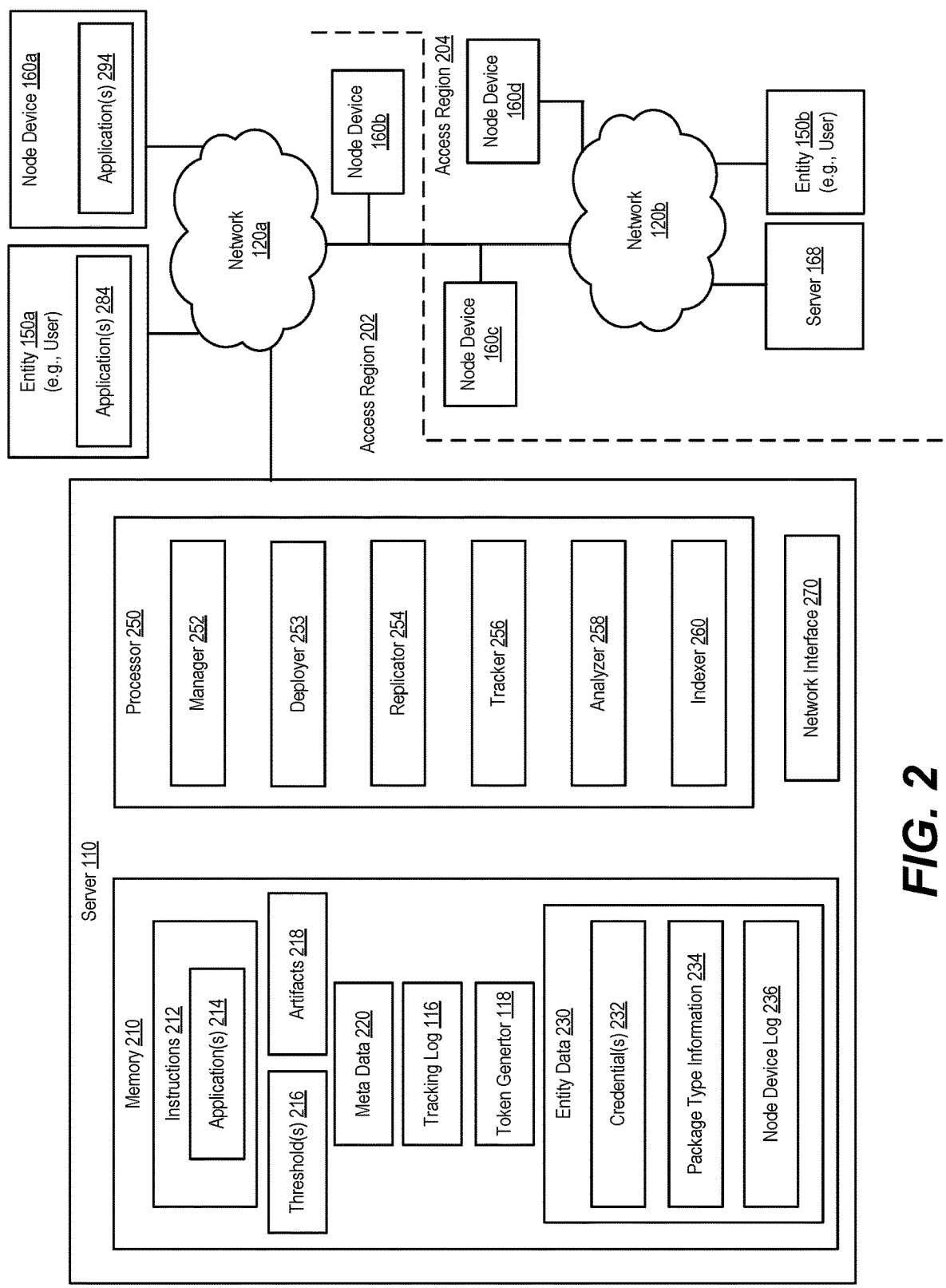
FIG. 2 is a block diagram of another example of a system for P2P downloading.

Referring to FIG. 2, a block diagram of a system for monitoring one or more files and/or enabling P2P downloading according to an embodiment is shown as a system 200. For example, system 200 may track and distribute a file across a network. System 200 may include or correspond to at least a portion of system 100. System 200 includes server 110, networks 120*a*, 120*b*, entities 150*a*, 150*b*, node devices 160*a*, 160*b*, 160*c*, 160*d*, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120*a*, 120*b* may include or correspond to network 120. Each of the entities 150*a*, 150*b* may include or correspond to entity 150. In some implementations, a first entity 150*a* and a second entity 150*b* may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), meta data 220, tracking log 116, a token generator 118, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to replicator 254.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, tracking log 116, token generator 118, entity data 230, or any combination thereof. In some implementations, memory 210 may include or be coupled to cloud storage such that one or more thresholds 216, one or more of artifacts 218, meta data 220, tracking log 116, token generator 118, and/or entity data 230 is stored at a cloud storage location and accessible by server 110.

Threshold(s) 216 may include or correspond to one or more thresholds, such as a time period threshold, a size threshold, a vulnerability threshold, etc. Artifacts 218 may include or correspond to file(s) 114. Meta data 220 may include meta data for file(s) 114, meta data for application 214, meta data for one or more files (e.g., 114), or any combination thereof. Meta data for a file (e.g., 114) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples. Memory 210 may also include software release information, which may include one or more checksums and metadata, such as meta data 220. The software release information (e.g., release bundle information) may correspond to and be transmitted with a software release, as further described in U.S. patent application Ser. No. 16/399,905.

Tracking log 116 includes a data structure, such as a log or table, that includes an indication of one or more files (e.g., one or more portions of one or more files) and indicates which node devices the files (or portions thereof) have been deployed to. Additionally, or alternatively, memory 210 may include a transaction log which includes an indication, such as a log, of one or more software releases and indications of which node devices the one or more software releases have been deployed to. Additionally, or alternatively, memory 210 may include vulnerability information may indicate vulnerabilities with one or more of files 114. For example, vulnerability information may include one or more checksums (indicating artifacts for which a risk is detected), license information associated with one or more artifacts, public keys that correspond to private keys used to affirm that a software release has successfully completed one or more stages of a development process, or a combination thereof. In some implementations, tracking log 116, the transaction log, and/or the vulnerability information may be combined into a single data structure.

Entity data 230 may include data associated with one or more entities. For example, entity data 230 may include or correspond to one or more of entity 150a, 150b. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key, a public key, and/or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PUP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a set of target nodes at which one or more security objects are to be synchronized. In some implementations, entity data 230 also includes permission data, such as permission data corresponding to one or nodes. The permission data may include information for one or more licenses, one or more permissions or settings, etc.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260) of processor 250, as described herein.

Deployer 253 may be configured to initiate and/or perform a software release distribution. For example, deployer 253 provides a secure and structured platform to distribute release one or more binaries as a single coherent release bundle to multiple remote locations and update them as new release versions are produced. For example, a release bundle may be generated and transmitted, as further described in U.S. patent application Ser. No. 16/399,905. A release bundle may include one or more files and/or release information which includes or indicates a list of the one or more files (e.g., artifacts) to be included in the release bundle and meta data (e.g., properties) associated with the release bundle. The release information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release data, and/or a size. Additionally, or alternatively, the release information may include a signature (or other cryptography technique) to render the release information immutable.

Deployer 253 may enable generation of a release bundle, auditing and traceability by tracking all changes associated with a file (e.g., artifact) or a release bundle distribution of the release bundle including permission levels release content, scheduling of a release bundle for distribution, tracking of a release bundle, stopping distribution of a release bundle, and/or selection of target destinations. Compiling and maintaining the information by deployer 253 enables tracker 256 to perform tracking of software releases to various node devices. Additionally, or alternatively, a software release may be provisioned amongst one or more nodes devices (e.g., 160a, 160b, 160c, 160d). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160a, 160b, 160c, 160d, or both. Replicator 245 may be configured to determine a difference between files in a software release and files stored at a node device and to replicate the files that are not stored at the node device, as further described with reference to U.S. patent application Ser. No. 16/399,938 and U.S. patent application Ser. No. 16/399,953. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device. In some implementations, replicator 254 may be configured to be used in conjunction with tracker 256 such that a portion of at least one file not stored at a node device is provided to the node device using P2P downloading as described further herein. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more files (e.g., portions of the one or more files), one or more artifacts, meta data, one or more release bundles, or any combination thereof deployed or attempted to be deployed to a node device, such as one or more of node devices 160a, 160b, 160c, 160d, a server (e.g., server 110, 168), or both. Tracker 256 may also maintain tracking log 116. Tracker 256 may be configured to be used in conjunction with deployer 253, replicator 254, and or analyzer 258 to track one or more files, one or more artifacts, meta data, one or more release bundles, or any combination thereof. In some implementations, tracker 256 includes a tracker module that includes one or more routines, executable by one or more processors (e.g., the processor 172 of FIG. 1) or processor 250 to track one or more files, one or more artifacts, meta data, one or more release bundles, or any combination thereof, provided or attempted to be provided to a node device, such as one or more of node devices 160a, 160b, 160c, 160d, and/or one or more servers.

Analyzer 258 may be configured to analyze one or more files or artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). For example, analyzer 258 may be configured to analyze one or more files for vulnerabilities based on vulnerability information (which indicates vulnerabilities with files). Analyzer 258 may be configured to analyze software prior to deployment in addition to analyzing software that has already been deployed (e.g., based on updated vulnerability information). Analyzer 258 may be configured to notify tracker 256 when a vulnerability is identified. In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

As described herein, a server (e.g., 110) may be configured to manage P2P download across a fast, reliable network (e.g., 120a), such as a network within an access region or a local area network (LAN). Accordingly, the server may enable distribution of a file and/or software to runtime nodes in the same region via P2P communication. The communication between peer devices (e.g., node devices and the server) may utilize HTTP rather than a traditional binary protocol used for conventional P2P communications. In some implementations, transport layer security (TLS) may be used for filed transfer and communication between peer devices. It is noted that server 110 may distribute files and/or software to server 168 which is in a different region. After server 168 receives the files and/or software, node devices (e.g., peer devices) within the access region 204 may request the file(s) and/or software from server 168. For example, the node devices may request server 168 to manage P2P distribution of the requested file(s) and/or software as described further herein.

Figure 3A:
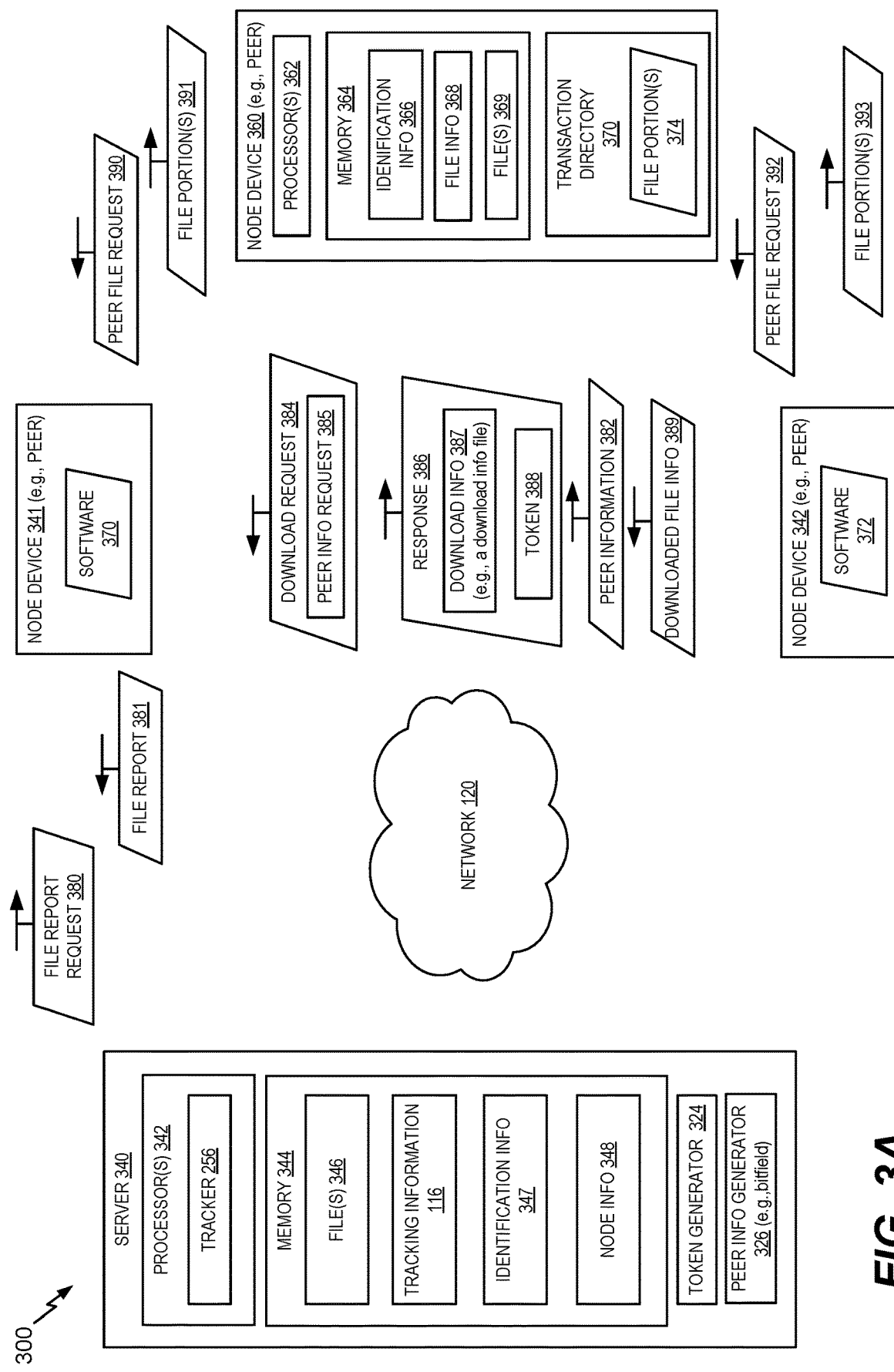
FIG. 3A is a block diagram of another example of a system for P2P downloading.

Referring to FIG. 3A, a block diagram of a system for P2P downloading is shown and designated 300. System 300 may include or correspond to at least a portion of system 100 and/or system 200. System 300 includes a server 340 and one or more node devices, such as representative node devices 340, 342, 360 (also referred to herein as a peer devices). Server 340 and node devices 340, 342, 360 may be coupled via one or more networks, such as network 120. Server 340 may include or correspond to server 110, server 168, or a combination thereof. Node device 360 may include or correspond to node device 160, 160a, 160b, 160c, 160d. In some implementations, system 300 also includes an entity device (also referred to herein as an entity). The entity device may include or correspond to entity 150, 150a, 150b, or any combination thereof. The entity device may be coupled to server 340 and node devices 340, 342, 360 via one or more networks, such as network 120. In some implementations, server 340 may be an edge node having a local area network (LAN) and at least one node device (e.g., 341) may be configured to communicate with server 340 via the LAN. In such implementations, the at least one node device may request server 340 to enable and/or manage P2P downloading as described further herein.

Server 340 includes one or more processors 342, a memory 344, a token generator 324, and a peer information generator 326. Processor 342 may include or correspond to processor 250. In a particular implementation, processor 342 includes tracker 256. Memory 344 may include or correspond to memory 210. Memory 344 includes a one or more files 346 (e.g., artifacts), tracking log 116, identification information 347, and an indication of one or more nodes 348, as further described herein. The one more files 346 may include or correspond to file(s) 114 and/or artifacts 218. In some implementations, files 346 may include or be apart of one or more software releases. Additionally, memory 344 may include instructions (not shown) that are executable by processor 342 to cause processor 342 to perform one or more operations. In some implementations, the instructions may include or be arranged as an application, such as application 214 (e.g., a software program). Additionally, or alternatively, token generator 342 and/or peer information generator 326 may include one or more modules stored at memory 344 and configured to be executable processor 342.

Identification information 347 may include or correspond to an identifier for server 340, node devices 340, 342, 360, or a combination thereof. For example, the identifier of the server 340 may include an address, such as a uniform resource locator (URL) of server 340 or tracker 256. As another example, the identifier for a node device, such as node device 360, may include an address (e.g., a URL) of node device 360.

Node information 348 may include or correspond to node device log 236 Additionally, or alternatively, node information 348 may include or indicate a bandwidth value of a node device (e.g., 360), a network interface of the node device via which the node device listens, a public key of the node device, or a combination thereof. In some implementations, node information 348 may include at least a portion of identification information 347.

Token generator 342 is configured to generate a token (e.g., 388). The token may be configured to expire after a time period. For example, the time period may be 30 seconds, as an illustrative, non-limiting example. The token may be generated and provided to node device (e.g., 360) to indicate a time period during which the node device may perform one or more activities, such as P2P downloading. In some implementations, the token may correspond to a particular file such that the one or more activities are restricted to operations corresponding to the particular file. The time period of the token may be extendable/renewable by server 340 or the node device. For example, the node device may be able to extend the time period or may request server 340 to extend the time period.

Peer information generator 326 is configured to generate one or more data structures that indicate or identify peer information, such as one or more peer devices (e.g., 340, 342, 360) that have or are interested in a file. An example of such peer information is described further herein at least with reference to FIG. 4B. In some implementations, the data structure may include, for a particular node device, a bitset that indicates which portions of a file are at the particular node device.

Although system 300 is described as including one server 340, in other implementations, system 300 may include multiple servers (e.g., 340) coupled to the entity device and/or node devices 340, 342, 360. Additionally, or alternatively, it is noted that server 340 (e.g., processor 342) may include one or more additional components or modules, such as manager 252, deployer 253, replicator 254, and/or indexer 260, as illustrative, non-limiting examples.

Referring to node device 360 includes one or more processors 362, a memory 364 (e.g., one or more memories), and a transaction directory 370. Transaction directory 370 may include or correspond to a storage device configured to receive and store at least a portion of one or more files. In some implementations, transaction directory 370 is distinct from memory 364. In other implementations, transaction directory 370 includes a logical or virtual portion of memory 364.

Memory 364 may include instructions (not shown) that are executable by processor 362 to cause processor 362 to perform one or more operations. In some implementations, the instructions may include or be arranged as an application, such as application 294 (e.g., a software program). Additionally, or alternatively, memory 364 may include one or more files (e.g., software). For example, memory 364, such as an LRU storing one or more files, may include the one or more files 369. Files 369 may enable node device 360 to engage in P2P downloading with other nodes as described herein. Memory may include identification information 366 and file information 368. Identification information 366 may include or correspond to identification information 347. File information 368 may include or correspond to a file, such as a file to be downloaded by or stored at node device. An example, of file information 368 is described further herein at least with reference to FIG. 4A.

Additionally, or alternatively, it is noted that node device 360 (e.g., processor 362) may include one or more additional components or modules, such as manager 252 and/or replicator 254, as illustrative, non-limiting examples. Although system 300 is described as including one node device 360, in other implementations, system 300 may include multiple node devices (e.g., 360) coupled to server 340.

Each of node devices 340, 342 may include one or more components as described with reference to node device 360. For example, node device 341 and/or node device 342 may include a corresponding processor (e.g., 362), a corresponding memory (e.g., 364), a corresponding transaction directory (e.g., 370), or a combination thereof.

The entity device (not shown) may include includes one or more processors and a memory. The memory may include instructions (not shown) that are executable by the processor to cause the processor to perform one or more operations. In some implementations, the instructions may include or be arranged as an application, such as application 284 (e.g., a software program), associated with server 340. The operations may include sending software information, receiving notifications, and/or sending instructions (e.g., download command 152), as further described herein.

During operation of system 300, one or more node devices may register with server 340. For example, node device 360 may perform one or more registration operations with server 340. The one or more registration operations may include node device 360 requesting and/or receiving a public certificate from server 340. The one or more registration operations may also include requesting and/or receiving a signed child-cert from server 340 over a Secure Sockets Layer (SSL). Node device 360 may receive and store one or more certificates from server 340 and initiate listening operations. For example, node device may listen to HTTP/2 connections on port 8852. Additionally, or alternatively, node device 360 may report livelihood information to sever 340. For example, node device 360 may report the livelihood information periodical, e.g., every 5 seconds, or non-periodically. It is noted that each node device may be configured with a URL of the server, a URL of tracker 256, a peer URL visible to other node devices. In some implementations, during the one or more registration operations, node device 360 may provide an indication of a bandwidth for node device 360 a peer wishes to handle, a network interface via which the node device 30 is to listen, or both. After a peer device is registered, the peer device may operate as both a requesting peer device and a providing peer device during P2P downloading.

A peer device, such as node device 360, may receive a download request. For example, node device 360 may receive a download request from a user, such as a user of an entity (e.g., 150). The download request may include or correspond to download command 152. Additionally, or alternatively, node device 360 may identify a file for downloading based on a software release or replication operations. For example, server 340 may generate a software release that includes one or more files selected by entity 150. The software release may include the one or more files (e.g., one or more of files) and release information, such as one or more checksums, metadata, or a combination thereof, as further described in U.S. patent application Ser. No. 16/399, 905. After generating software release, server 340 (e.g., an edge node) may initiate transmission of software release to other edge nodes, such as other servers (e.g., 110, 168). Initiating transmission may include deploying software release, which may include replicating some of the one or more files, as further described in U.S. patent application Ser. No. 16/399,938 and U.S. patent application Ser. No. 16/399,953. Additionally, or alternatively, server 340 may manage and/or enable P2P downloading operations of file(s) and/or software to node devices as described herein. In such implementations, the file(s) and/or software may be stored at server 340 and requested by at least one node device for P2P downloading.

Node device 360 may identify one or more files for downloading and may send a download request 384 to server 340. In some implementations, download request 384 may include a peer information request 385 for one or more peer devices that include one or portions of a file requested by node device 360. Alternatively, peer information request 385 may be sent separate from download request 384.

In response to receiving download request 384, server 340 may check one or more permissions corresponding to node device 360 prior to sending a response 386 to download request 384. For example, download request 384 may include one or more permissions (e.g., Docker bearer token, or Basic auth.) which may be compared to entity data 230 (e.g., credential(s) 232). If the permissions are not verified, server 340 discards download request 384, notifies node device 360 that the permissions are not verified, or both.

Download request 384 may request server 340 to provide download information 387. In an illustrative, non-limiting example, download information 387 includes a "metainfo" structure comprised of pieces of data (e.g., 256 Kb or another size) and their sha2 checksums+the sha2 of the complete file. Additionally, or alternatively, download information 387 may include an index value (e.g., an index number) indicating an order/position of the portion with the file. An illustrative example of download information is described further herein at least with reference to FIG. 4A.

Responsive to download request 384, server 340 may generate a token 388 (e.g., a download token) for node device 360. Token 388 may be configured to expire after a time period during which node device 360 may download the download information 387, engage in P2P downloading, or both. To illustrate, the time period may be 30 seconds, as an illustrative, non-limiting example. It is noted that clock synchronization between node device 360 and server 340 needs to be accurate, otherwise, a long time period may be needed, such as more than 30 seconds.

Server 340 may update tracking information to indicate that node device 360 is interested in the requested file for P2P downloading. Additionally, or alternatively, server 340 sends response 386 to node device 360. Although response 386 is shown as including download information 387 and token 388, in other implementations, download information 387 and token 388 may be sent in separate messages. For example, token 388 may be sent prior to download information 387. Alternatively, download information 387 may be sent prior to or concurrently with token 388. In some implementations, node device 360 may store download information 387 as file information 368.

Referring to peer information request 385, sever 340 may identified one or more devices (e.g., one or more node devices) that have or are interested in the same download information 387, such as the same download file information. Peer information generator 326 may identify the one or more peer devices based on tracking information 116, entity data 230, permission or license information, or a combination thereof. In this manner server 340 may control a number of P2P connections that may be formed by node device 360. In some implementations, server 340 (e.g., peer information generator 326) may check with one or more registered peer devices to determine whether or not the peer devices has the file in storage. To illustrate, server 340 may send a file report request 380 to node device 341 and may receive a file report 381 in response. File report 381 may indicates one or more files or software 370 sored at node device 341.

Responsive to peer information request 385, node device 360 may receive peer information 382. If peer information 382 indicates less than or equal to a threshold number of devices, node device 360 may send another peer information request (e.g., 385) for identification of additional peer devices.

Node device 360 establishes HTTP/2 connections with peer devices identified in peer information 382. For example, node device 360 may attempt to establish one HTTP/2 connection with each of the peer devices with the intent to keep the connections alive and saturated for best bandwidth.

Additionally, node device 360 may request server 340 to identify which portions of the file are with which peer devices, such as the peer devices identified in peer information 382. In some implementations, node device 360 may request such information only for the peer devices for which a HTTP/2 connection has been established. Sever 340 may identify which portions of the file are stored at which peer devices based on tracking information 116. For each node device, server 340 may generate a bit field (e.g., a bitset) and send the bit field information to node device 360. An example of such bit field information is described further herein at least with reference to FIG. 4B. Although described as the bit field information being separate from peer information 382, in some implementations, the bit field information and peer information 382 may be combined into a single data structure that is sent to node device 360. It is noted that server 340 may generate and send multiple versions of bit field information to node device 360 as portions of the file at different node devices may change over time for peer devices that want to receive the file.

Node device 360 may select a portion of the file for P2P download randomly or based on one or more rules. For example, the one or more rules may include a first rule in which portions are selected based on rarity. Rarity may be determined based on a number of peer devices that have the portion to offer. For example, a portion may be considered rare if 2 or fewer peer devices have the portion. As another example, rarity may be determined relative to other portions or as any portion in which less of a majority of peer devices (identified to node device 360) have the portion. A second rule of the one or more rules may indicate that if multiple portions can be selected (and/or are rare), a portion is selected based on index value. To illustrate, a portion with a low index value (e.g., a low position) in the file may be selected so that node device 360 can start streaming a result to a user as the portion(s) come in.

After selection of the portion of the file, node device 360 can send requests, via the HTTP/2 to one or more peer devices for the portion. For example, node device 360 sends a peer file request 390 to node device 341 and sends a peer file request 392 to node device 342. Node device 360 may receive the requested file from node device 341. For example, node device 360 may receive the requested file via HTTPs (SSL). In some implementations, node device 360 may receive the requested portion over SSL using the server peer trusted certificate (e.g., the signed certificate). Responsive to the peer file requests 390, 392, node device 360 may receive one or more file portions 391 from node device 341 and/or one or more file portions 393 from node device 342.

As an example of node device 360 selecting a portion of the file, portions of the file may be ordered sequentially from a first portion to last portion. Node device 360 may determine a peer group size to determine a window size and may scramble the portions for each window. Node device may select a portion and begin a download from a particular peer and continue using by using round-robin scheduling for the peers. Ordering of file portions sequentially using windows allows a receiving node device to consume a continuous stream of a file early on (prior to receiving an entirety of the file), rather than waiting for an entirety of the file to be fully available on the device before it can be consumed. To illustrate, node device 360 may identify multiple portions of a file, such as eight portions (e.g., sequential portions) referred to as p1-p8. Additionally, node device 360 may receive information from server 340 indicating which node devices (e.g., peer devices) include which portions of the file. For example, node device 360 may determine that a first peer device (e.g., 341) includes p1-p3, p4, p5, and p8 and determine that a second peer device (e.g., 342) includes p2-p8. Node device 360 may select a window size for determining windowed portions (of the multiple portions). For example, node device 360 may select the window size as a default value or based on a number of available nodes from which node device 360 can receive portions of the file. To illustrate, node device 360 may set the window size to 2 and may identify p1-p2 as a first windowed portion, p3-p4 as a second windowed portion, p5-p6 as a third windowed portion, and p7-p8 as a fourth windowed portion.

Node device 360 may then request a first set of the multiple portions from the first peer device (e.g., 341) and a second set of the multiple portions from the second peer device (e.g., 342). To illustrate, node device 360 may determine the first set such that it has a portion of each of the four windows and may determine the second set such that it has a different portion of each of the four windows. For example, the first set (requested from first peer device (e.g., 341)) may include p1, p3, p6, p8 and the second set (requested from second peer device (e.g., 342)) may include p2, p4, p5, p7. In some implementations, node device 360 may scramble or randomize the portions within a given window prior to selecting different portions for inclusion in different sets. It is noted that the first set (requested from first peer device (e.g., 341)) includes p1 which is only available from the first peer device, and the second set (requested form second peer device (e.g., 342) includes p4 and p7 which are only available from the second peer device (e.g., 342). After requesting the first set from the first peer device and the second set from the second peer device, node device 360 may receive portions from the first and second peer devices such that node device 360 can begin executing (e.g., streaming) the portions (based on the windowed portions). To illustrate, node device 360 may receive p1 (from the first peer device) and p2 (from the second peer device). Once node device 360 has received p1 and p2 of the first windowed portion, node device 360 select the first windowed portion for streaming. After the first windowed portion, node device 360 may continue to stream the second windowed portion once node device 360 has received p3 (from first peer device) and p4 (from second peer device). Although described as having eight portions that are requested from among two different peer devices, in other implementations, the multiple portions may have fewer or more than eight portions, and/or may request the portions from more than 2 different devices. Additionally, or alternatively, although described as using four windowed portions, in other implementations, fewer or more than four windowed portions may be used.

It is noted that a node device (e.g., 341, 342, 360) can serve a number of downloads while maintaining a bandwidth less than or equal to a bandwidth download limit. For example, up to four downloads may be performed. Accordingly, a particular node device may temporarily refuse a download. If a peer file request (e.g., 390, 391) is refused, node device 360 may retry the same node device or may try another node device. If all node devices known to node device 360 to have a particular portion of the file have been tried (and failed), node device 360 may send a new peer information request (e.g., 385).

Node device may receive one or more portions (e.g., file portions 374) which are stored in transaction directory 370. After node device 360 receives the portion of the file, node device 360 is configured to validate the portion based on the corresponding checksum (from download information 387) for the portion. If node device 360 validates the received portion, node device 360 may report to server 340 that the portion (by its index number and file hash) has been received. In some implementations, node device 360 may report after node device 360 validates an entirety of the file. Additionally, after receiving and/or validating the portion, node device 260 may continue to request another portion or, if no more portions are left to be acquired, may validate an entirety of the file. Based on an entirety of the file being validated, the HTTP/2 connections are closed and token 388 is left to expire.

Figure 3B:
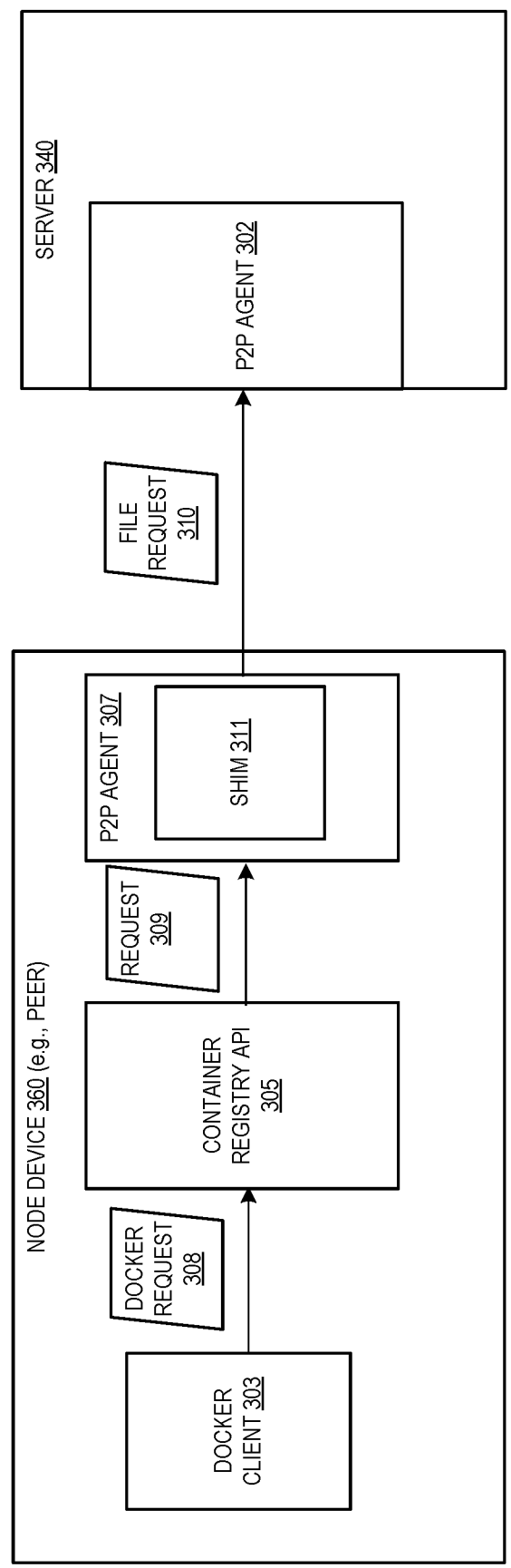
FIG. 3B is a block diagram illustrating downloading of a Docker file.

In some implementations, the file for P2P deployment is a Docker file. For example, referring to FIG. 3B, an example of operations corresponding to downloading of a Docker file are shown with reference to node device 360 and server 340 of FIG. 3A. In FIG. 3B, node device 360 includes a Docker client 303, a container registry application program interface (API) 305, and a P2P agent 307. Server 340 includes P2P agent 302.

Docker client 303 (e.g., a container registry client) may be configured to communicate directly to server 340, which may also include or be configured to operate as a container registry. For example, communication with the container registry (of server 340) may occur via a container registry API (not shown) of server 340. To communicate with server 340 and/or the container registry of server 340, Docker client 303 of node device 360 is configured to communicate with a container registry shim 111 running on node device 360. Shim 311 may include a library that transparently intercepts API calls and changes the argument passed, handles the operation itself, or redirects the operation elsewhere. As shown, shim 111 is included in P2P agent 307. The communication between Docker client 303 and shim 111 is performed using container registry API 305. For example, Docker client 303 may send a Docker request 308 to container registry API 305 and container registry API 305 may send a corresponding request 309 to shim 111.

Shim 311 translates Container Registry API calls (e.g., request 309) to 2 types of requests: 1) login requests and 2) container-layer download requests. For a login request, the login request may be proxied by the shim 311 to the container registry (of server 340), and server 340 authenticates the Docker client 303 of node device 360. For a container-layer download request, shim 111 may translate request 309 into the container-layer download request if Docker request 308 included "/aip/v2/blobs/ . . . ", as an illustrative, non-limiting pseudo example of an API call. The layer-download request is translated by shim 311 to a direct file download request (e.g., fil request 310), which is handled by the P2P agent 307 (e.g., P2P client logic) of node device 360. A file download is served as a P2P file download, effectively serving container-layer downloads using P2P optimization, and dramatically speeding up the delivery of a container image (that is comprised of multiple layers) to the Docker client 303.

Referring again to FIG. 3A, according to yet another embodiment, a system (e.g., 300, 340) for managing peer-to-peer (P2P) downloading via a network (e.g., 120) is described. The system (e.g., 300, 340) includes at least one memory (e.g., 344) storing instructions and one or more processors (e.g., 342) coupled to the at least one memory (e.g., 344). The one or more processors (e.g., 342) are configured to execute the instructions to cause the one or more processors (e.g., 342) to receive a request (e.g., 384) from a peer device (e.g., 360) for at least a portion of a file (e.g., 162). The one or more processors (e.g., 342) can further be configured to execute the instructions to cause the one or more processors to send download information (e.g., 3387) to the peer device (e.g., 360), the download information (e.g., 3387) including a checksum corresponding to the portion of the file. The one or more processors (e.g., 342) are further configured to execute the instructions to cause the one or more processors (e.g., 342) to send, to the peer device, a token (e.g., 388) corresponding to authorization for the peer device (e.g., 360) to perform P2P communication. The one or more processors (e.g., 342) are further configured to execute the instructions to cause the one or more processors (e.g., 342) to end, to the peer device, an indicator that identifies at least one peer device that includes the portion of the file. The one or more processors (e.g., 342) are further configured to execute the instructions to cause the one or more processors (e.g., 342) to update tracking information (e.g., 116) to indicate that the peer device (e.g., 360) received the portion of the file.

According to another embodiment, a computer program product is described that includes a computer-readable storage device, such as a non-transitory computer-readable storage medium, that includes instructions that, when executed by one or more processors (e.g., 342), cause the one or more processors to perform operations for managing peer-to-peer (P2P) downloading via a network (e.g., 120). The operations include executing a first routine to receive a request (e.g., 384) from a peer device (e.g., 360) for at least a portion of a file (e.g., 162). The operations further include executing a second routine to send download information (e.g., 387) to the peer device (e.g., 360), the download information (e.g., 387) including a checksum corresponding to the portion of the file. The operations also include executing a third routine to send, to the peer device (e.g., 360), a token (e.g., 388) corresponding to authorization for the peer device (e.g., 360) to perform P2P communication, executing a fourth routine to send, to the peer device (e.g., 360), an indicator that identifies at least one peer device (e.g., 340, 342) that includes the portion of the file, and executing a fifth routine to update tracking information (e.g., 1160) to indicate that the peer device (e.g., 360) received the portion of the file.

According to yet another embodiment, a system (e.g., 300, 360) for peer-to-peer (P2P) downloading via a network (e.g., 120) is described. The system (e.g., 300, 360) includes at least one memory storing instructions and one or more processors (e.g., 362) coupled to the at least one memory (e.g., 364). The one or more processors (e.g., 362) are configured to execute the instructions to cause the one or more processors (e.g., 362) to receive a download command (e.g., 152) for a file, and send, to a server (e.g., 340), a download request (e.g., 384) based on the download command (e.g., 152). The one or more processors (e.g., 362) can further be configured to execute the instructions to cause the one or more processors (e.g., 362) to receive, from the server (e.g., 340), download information (e.g., 387) including a checksum corresponding to at least a portion of the file, and receive, from the server (e.g., 340), an indicator that identifies at least one device (e.g., 340, 342) that includes the portion of the file. The one or more processors (e.g., 362) are further configured to execute the instructions to cause the one or more processors (e.g., 362) to send, to the server (e.g., 340), downloaded file information (e.g., 389) indicating that the peer device (e.g., 360) verified, based on the checksum, receipt of the portion of the file from the at least one device (e.g., 340, 342).

According to yet another embodiment, a computer program product is described that includes a computer-readable storage device, such as a non-transitory computer-readable storage medium, that includes instructions that, when executed by one or more processors (e.g., 362), cause the one or more processors (e.g., 362) to perform operations for peer-to-peer (P2P) downloading via a network. The operations include executing a first routine to receive a download command (e.g., 152) for a file. The operations further include executing a second routine to send, to a server (e.g., 340), a download request (e.g., 384) based on the download command (e.g., 152). The operations also include executing a third routine to receive, from the server (e.g., 340), download information (e.g., 387) including a checksum corresponding to the whole file and at least a portion of the file, executing a fourth routine to receive, from the server (e.g., 340), an indicator that identifies at least one device (e.g., 340, 342) that includes the portion of the file, and executing a fifth routine to send, to the server (e.g., 340), downloaded file information (e.g., 389) indicating that the peer device (e.g., 360) verified, based on the checksum, receipt of the portion of the file from the at least one device (e.g., 340, 342).

In some implementations, download communications between node devices (e.g., P2P communication) may be SSL-encrypted using a certificate-chain created by server 340, such as using signed certificates from server 340. As node device 360 downloads one or more portions of the file, node device may advertise information about portions of files that the node device 360 has received. Such information may be stored at server 340 and communicated from server 340 to one or more other servers, such as server 168. It is noted that for purposes of node device 360 downloading from one or more peers, server 340 may be considered a peer device that can provide one or more portions of the file to node device 360. It is further noted that communications between two node devices (via peer-to-peer sub-piece download API) and between a node device and server 340 (via a server API) may use gRPC, which is an open source remote procedure call (RPC) based on the HTTP/2 protocol.

Thus, FIGS. 3A and/or 3B describes a system (e.g., 300) for P2P downloading. Server 340 (e.g., tracker 256) maintains tracking information 116 regarding which node devices (e.g., peer devices) include which portions of a file. Server 340 (e.g., tracker 256) actively controls and informs to inform node devices of the availability of different portions of the file from different node devices to coordinate P2P downloading amongst the node devices. By having an active role, server 340 (e.g., tracker 256) enables efficient and secure (e.g, authenticated and/or authorized) P2P downloads between devices and reduces network burden/flooding to and from server 340 (e.g., tacker 256). Additionally, as part of the active role, server 340 enables increased security through encryption while a standard protocol may be used for P2P communication. For example, the communication between node devices and server 340 may utilize HTTP rather than a traditional binary protocol used for conventional P2P communication. In some implementations, transport layer security (TLS) may be used for file transfer and communication between node devices.

Figures 4A, 4B:
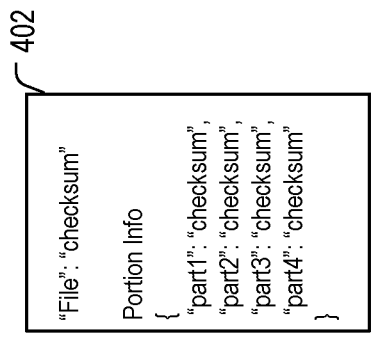
FIG. 4A illustrates an example of file information for P2P downloading.
FIG. 4B illustrates an example of a peer information for P2P downloading.

FIGS. 4A-4B illustrate examples of data structures are shown. For example, FIG. 4A illustrates an example of file information (e.g., 402) for P2P downloading and FIG. 4B illustrates an example of a peer information (e.g., 410) for P2P downloading. The file information and/or the peer information may be compiled and maintained by a server, such as server 110, server 168, server 340, or any combination thereof. Additionally, or alternatively, the file information and/or the peer information may be compiled and maintained by a node device, such as node device 160, 340, 342, 360.

Referring to FIG. 4A, an example of file information 402 is shown. File information includes information associated with a file, such as file 162. File information 402 may include or correspond to file information 368, download information 387, or a combination thereof. File information 402 may include one or more checksums for one or more portions (also referred to as parts) of a file included in a software release (or any kind of software update/distribution), a start identifier and an end identifier (e.g., a size identifier), a checksum for an entirety of the file, and a size indicator for the entirety of the file. Additionally, or alternatively, file information may also include a file name, a length, a mime-type, or a combination thereof.

In the implementation illustrated in FIG. 4A, file information 402 includes checksums for the entire file and four particular parts of a particular file: "part1," "part2," "part3," and "part4." Although particular informational items are illustrated in FIG. 4A, in other implementations, file information 402 may include fewer information items or more information items than illustrated in FIG. 4A. The data structure illustrated in FIG. 4A is for illustration only, and in other implementations, file information 402 may include a different data structure.

Referring to FIG. 4B, an example of peer information 410 is shown. Peer information 410 may include or correspond to tracking log 116, peer information generated by peer information generator 326, download information 387, or a combination thereof. As shown, peer information includes a column to identify peer devices (e.g., node devices) and a set of columns corresponding to one or more portions of a file, such as file 162. For example, the peer devices may include one or more peer devices, such as a first peer device (Peer_1), a second peer device (Peer_2), and a third peer device (Peer_n). Although shown as having three peer devices, fewer or more peer devices may be identified in the column of peer devices. The portions of the file may include multiple portions, such as a first portion (P1), a second portion (P2), a third portion (P3), a fourth portion (P4), a fifth portion (P5), and a sixth portion (Px). Although shown as having six portions, the portions of the file may include fewer or more portions.

As shown, peer information 410 includes multiple entries, such as a first entry 412, a second entry 414, and a third entry 416. Each entry 412, 414, 416 may correspond to a peer device. For example, first entry 412 corresponds to first peer device (Peer_1), second entry 414 corresponding to second peer device (Peer_2), and third entry 416 corresponds to third peer device (Peer_n). Each peer device may be identified by an identifier, such as a unique device identifier or a URL corresponding to the peer device. Additionally, each entry 412, 414, 416 may include a bitset which indicates which portions of the file a particular are at a particular peer device. For example, dashed box 422 indicates a representative bitset of first entry 412. Regarding bitset 422, a value of one ("1") indicates that peer device has the corresponding portion and a value of zero ("0") indicates that the peer device does not have the corresponding portion. In other implementations, a value of zero ("0") indicates that peer device has the corresponding portion and a value of one ("1") indicates that the peer device does not have the corresponding portion.

Figure 5:
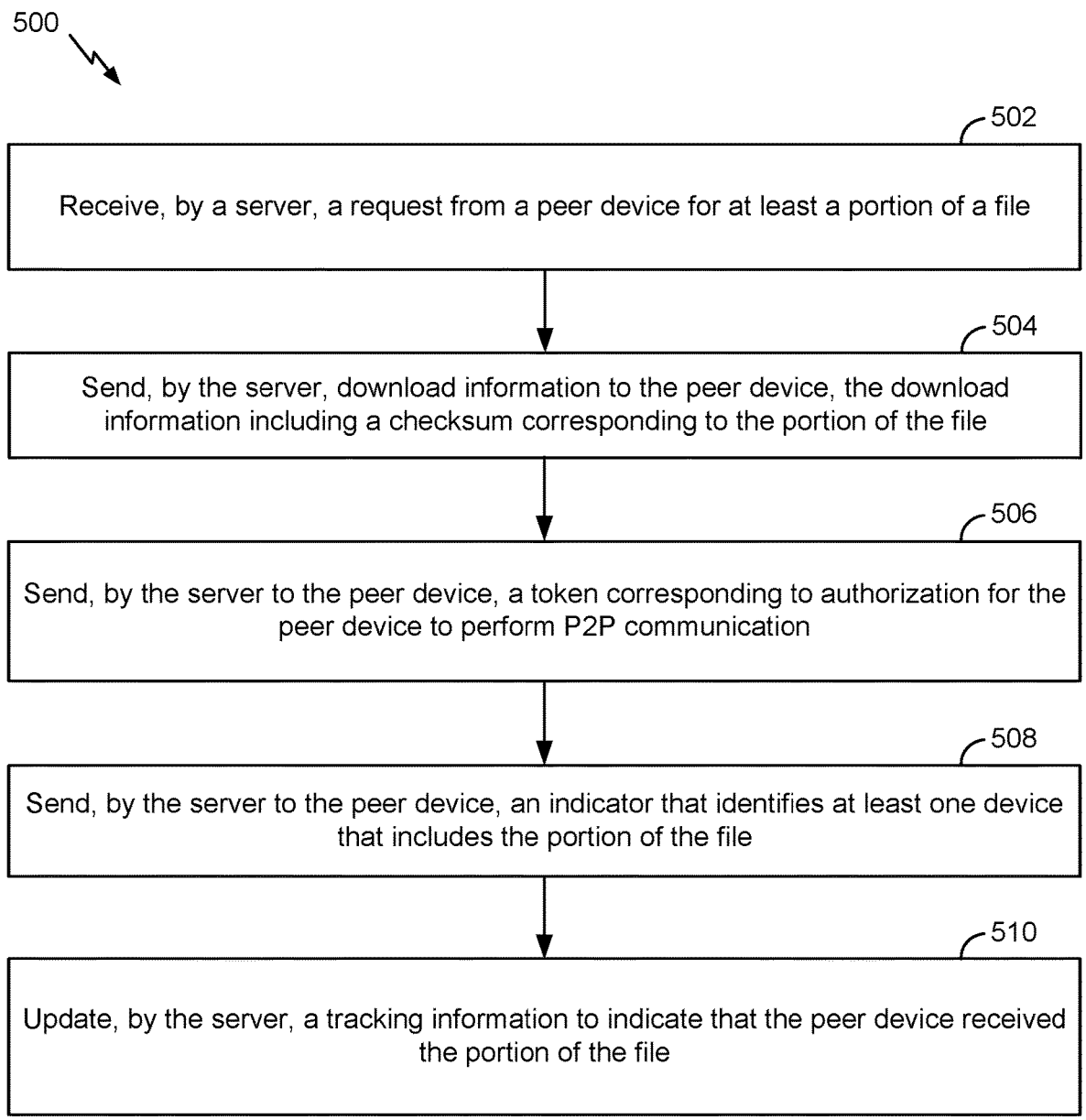
FIG. 5 is a flow diagram of an example of a method for coordinating P2P downloading.

Referring to FIG. 5, a flow diagram of a method for coordinating P2P downloading according to an embodiment is shown as a method 500. In a particular implementation, method 500 may be performed by server 110, 168 (e.g., one or more processors 250, 342, tracker 256, and/or analyzer 258), and/or server 340.

At 502, method 500 includes receiving, by a server, a request from a peer device for at least a portion of a file. For example, the server may include or correspond to server 110, 168 or server 340. The peer device may include or correspond to a device, such as node device 160, 160a, 160b, 160c, 160d, or node device 341, 342, 360. The request may include or correspond to download request 384. In some implementations, after receiving the request, and prior to sending download information, the server may check and/or verify that the peer device has permission to receive and read the requested file. Based on a determination that the peer device does not have the proper permission, the server may discard the request. Alternatively, based on a determination that the peer device does have permission, the server may proceed with providing download information.

At 504, method 500 includes sending, by the server, download information to the peer device, the download information including a checksum corresponding to the portion of the file. For example, the download information may include or correspond to response 386, download information 387, or both. In some implementations, the download information comprises a download information file. In some implementations, method 500 may also include generating, by the server and based on the request, the download information. The download information may include a checksum for an entirety of the file and, for each portion of the file, a checksum.

At 506, method 500 includes sending, by the server to the peer device, a token corresponding to authorization for the peer device to perform P2P communication. For example, the token may include or correspond to token 388. In some implementations, method 500 may also include generating, by the server and based on the request, the token. The token may be configured to indicate a time period during which the peer device is authorized to perform the P2P communication. In some such implementations, method 500 may also include receiving, by the server, a request to extend the time period corresponding to the token. The server may determine whether or not to extend the period.

At 508, method 500 includes sending, by the server to the peer device, an indicator that identifies at least one peer device that includes the portion of the file. The indicator may include or correspond to a peer device identifier. In some such implementations, prior to sending the indicator, method 500 may also include receiving, by the server from the peer device, a request to identify the least one peer device that includes the portion of the file. The request to identify the at least one peer device may include or correspond to download request 384. In some such implementations, the server may identify the at least one peer device that includes the portion of the file based on tracking information (e.g., 116) maintained by the server and generate the indicator based on the identified at least one peer device.

In some implementations, method 500 may also include after sending the indicator, receiving, by the server from the peer device, a request to identify another peer device that includes the portion of the file. Based on receiving the request to identify another peer device, the server may identify and send, to the peer device, another indicator that identifies an additional peer device that includes the portion of the file.

At 510, method 500 includes updating, by the server, a tracking able to indicate that the peer device received the portion of the file. The tracking information may include or correspond to tracking information 116.

In some implementations, method 500 may also include registering, by the server, the peer device. Registering the peer device may include sending a public key of the server to the peer device and receiving a public key of the peer device. In some such implementations, the server may signing the public key of the peer device and send the signed public key of the peer device to the peer device.

In some implementations, method 500 may also include identifying, by the server and based on the request, one or more permission data corresponding to the peer device. The permission data may include or correspond to entity data 230. In some such implementations, method 500 may further include determining, by the server, whether to allow the peer device to receive the portion of the file based on the permission data. Based on a determination to allow the peer device to receive the portion of the file, the server may send the download information, the token, the indicator, or a combination thereof. Alternatively, based on a determination to not allow the peer device to receive the portion of the file, the server may disregard the request, may notify the peer device that the request is denied, or a combination thereof.

In some implementations, method 500 may also include sending, by the server, a request to the peer device, the at least one peer device, or both, for information related to which portions of the file are stored at the corresponding peer device. Additionally, or alternatively, method 500 may also include receiving, by the server from the at least one peer device, information related to which portions of the file are stored at the at least one peer device, information related to which portions of the file are stored at the peer device, or both.

Thus, method 500 describes coordinating P2P downloading of one or more portions of a file. For example, the server authorize a peer device to securely communicate with another peer device to efficiently perform a P2P download of one or more portions a file.

Figure 6:
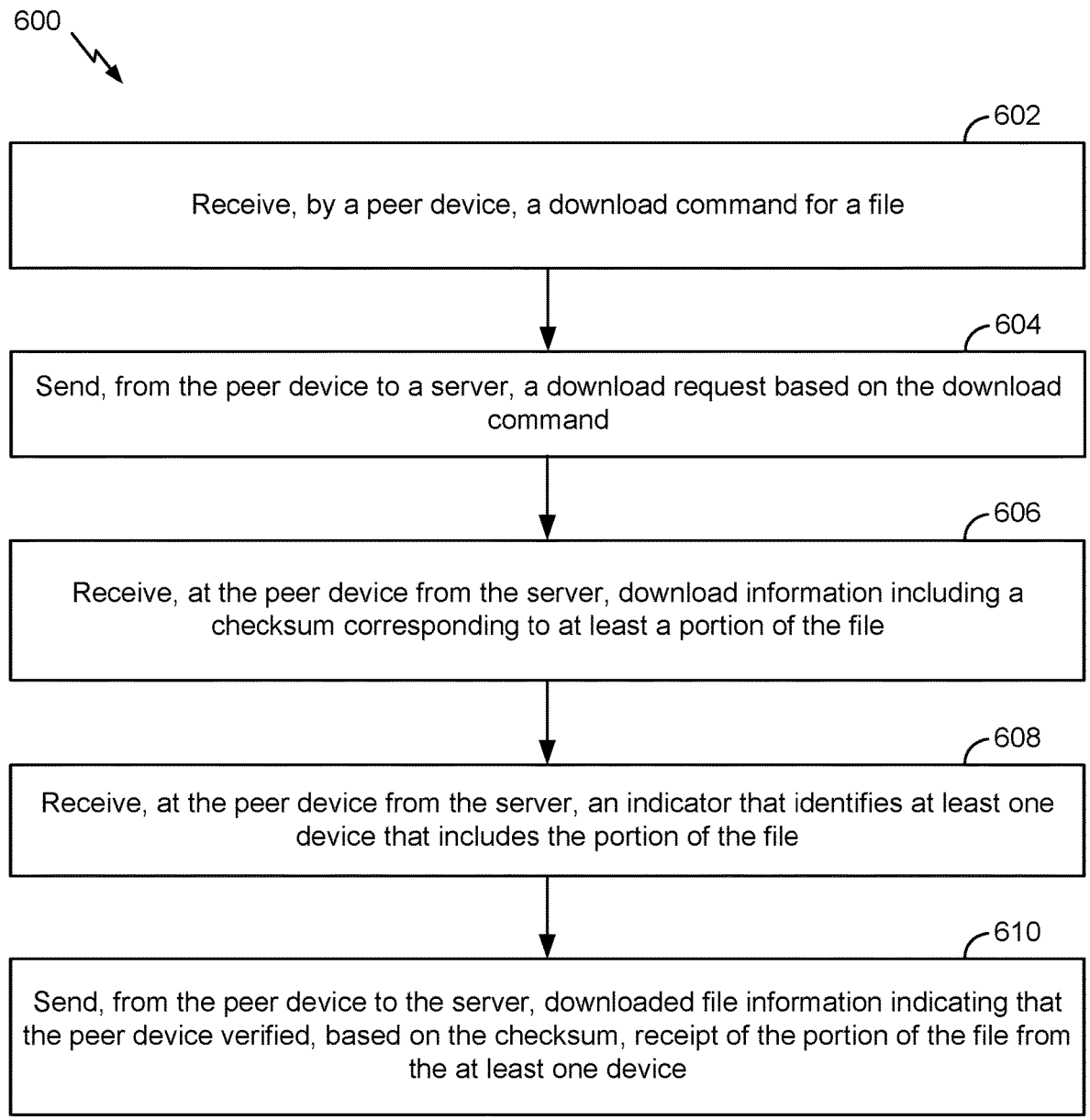
FIG. 6 is a flow diagram of an example of a method for performing P2P downloading.

Referring to FIG. 6, a flow diagram of a method for receiving P2P downloading according to an embodiment is shown as a method 600. Method 600 may be performed by a device, such as node device 160, 160*a*, 160*b*, 160*c*, 160*d*, or node device 341, 342, 360. For example, method 600 may be performed by a processor, such as processor 362.

At 602, method 600 includes receiving, by a peer device, a download command for a file. For example, the peer device may include or correspond to a device, such as node device 160, 160*a*, 160*b*, 160*c*, 160*d*, or node device 341, 342, 360. The server may include or correspond to server 110, 168 or server 340. The download command may be received from an entity device and may include or correspond to download command 152.

At 604, method 600 includes sending, from the peer device to a server, a download request based on the download command. For example, the download request may include or correspond to download request 384.

At 606, method 600 includes receiving, at the peer device from the server, download information including a checksum corresponding to at least a portion of the file. For example, the download information may include or correspond to response 386, download information 387, or file information 402.

At 608, method 600 includes receiving, at the peer device from the server, an indicator that identifies at least one device that includes the portion of the file. The indicator may include or correspond to a peer device identifier. In some implementations, the indicator may be included in response 386. In some implementations, method 600 also includes sending, from the peer device to the server, a peer information request. The peer information request may include or correspond to peer information request 385. In some such implementations, the indicator comprises a bitset (e.g., 422) that indicates which portions of the file are at the at least one device.

At 610, method 600 includes sending, from the peer device to the server, downloaded file information indicating that the peer device verified, based on the checksum, receipt of the portion of the file from the at least one device. For example, the downloaded file information may include or correspond to downloaded file information 389.

In some implementations, method 600 also includes registering, by the peer device, with the server. For example, registering with the server may include receiving, at the peer device from the server, a public key of the server, sending, from the peer device to the server, a public key of the peer device, and receiving, at the peer device from the server, a signed version of the public key of the peer device. The peer device may use the signed version of the public key of the peer device during P2P communications with another peer device. To illustrate, the other peer device may also be registered with the server and may authenticate the peer device based on the signed version of the public key of the peer device.

In some implementations, method 600 also includes receiving, at the peer device from the server, a token. For example, the token may include or correspond to token 388. The peer device may determine whether or not the token is valid. Based on a determination that the token is expired or about to expire (e.g., expire within a threshold amount of time), the peer device may send a request to renew the token to the server.

In some implementations, method 600 may also include determine, by the peer device, the portion of the file at the at least one device based on the download information. Additionally, or alternatively, method 600 also includes identifying, by the peer device, the at least one device based on the indicator and establishing a communication link between the peer device and the at least one device. The peer device may send a peer file request to the at least one device for the portion of the file via the communication link.

In some implementations, method 600 also includes determining, by the peer device, a number of peer devices communicating with the peer device. The peer device may compare the number to a threshold. Based on a determination that the number is less than or equal to the threshold, the peer device may send a request for the server to identify one or more peer devices. In some implementations, method 600 also includes the peer device may select the portion to be requested from multiple portions of the file based on one or more conditions. For example, the conditions may include a rarity of the portion, an index position of the portion, or both.

In some implementations, the at least one device comprises a first peer device and a second peer device. In some such implementations, method 600 also includes receiving, by the peer device, one or more portions of the file from the first peer device, the second peer device, or both. The peer device may receive the portion of the file and verify, based on the checksum, the portion of the file received from the at least one device or an entirety of the file.

Thus, method 600 describes receiving P2P downloading of one or more portions of a file. For example, peer devices may securely communicate to efficiently perform a P2P download of one or more portions a file. By coordinating with the server, a requesting peer device may quickly receive one or more portions of a file for use by the requesting peer device.

Figure 7:
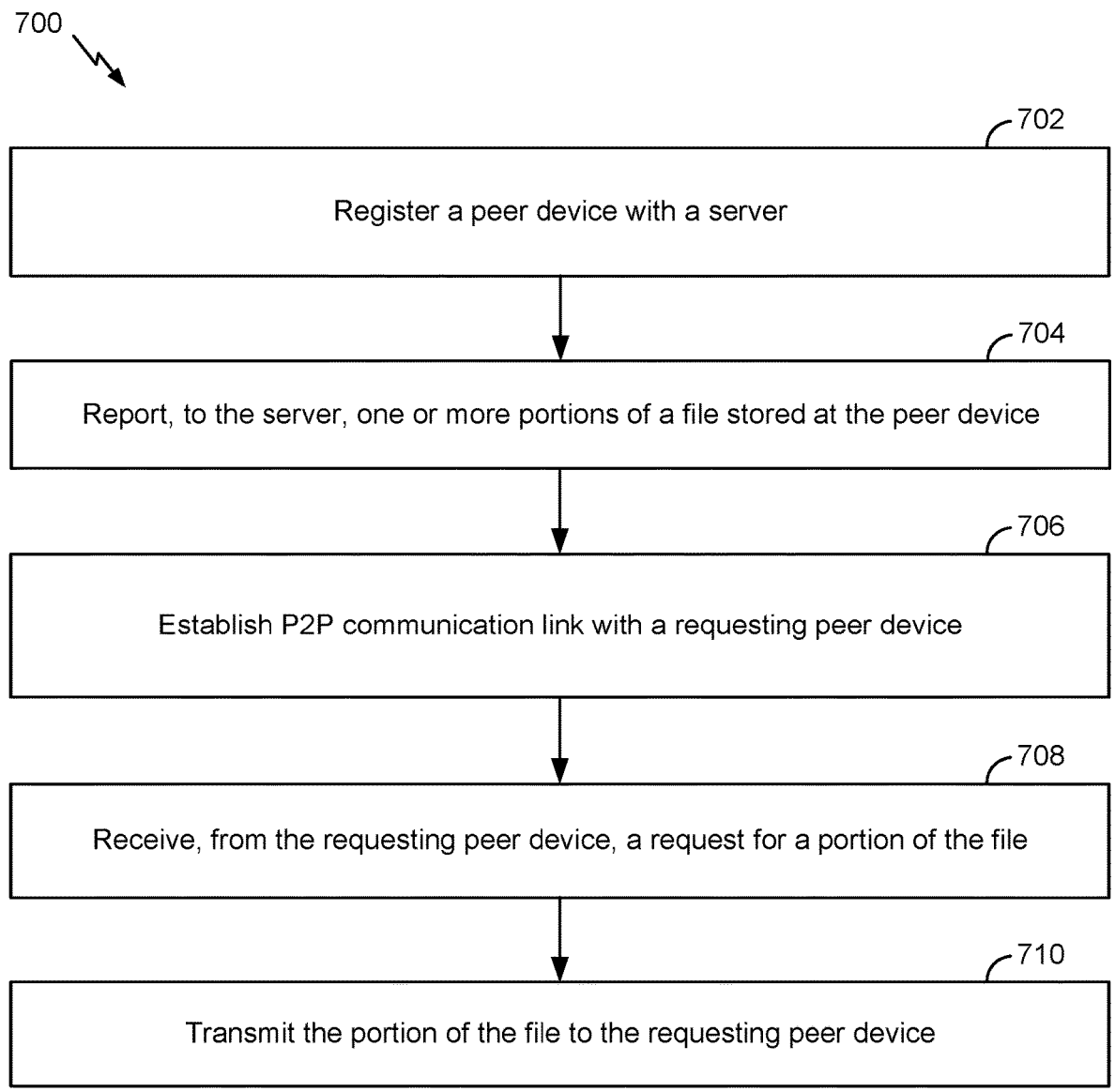
FIG. 7 is a flow diagram of an example of a method for performing P2P downloading.

Referring to FIG. 7, a flow diagram of a method for providing P2P downloading according to an embodiment is shown as a method 700. Method 700 may be performed by a device, such as node device 160, 160a, 160b, 160c, 160d, or node device 341, 342, 360. For example, method 700 may be performed by a processor, such as processor 362.

At 702, method 700 includes registering a peer device with a server. For example, in a particular implementation, the peer device includes or corresponds to node device 360. The server may include or correspond to server 110, server 168, or server 340.

At 704, method 700 includes reporting, to the server, one or more portions of a file stored at the peer device. For example, the peer device may send a report to the server. The report may include or correspond to file report 381, download file information 389, or one or more portions of the file stored at the peer device. In some implementations, the peer device may send the report responsive to a request received from the server. Alternatively, the peer device may send the report to the server without being prompted by the server—e.g., without receiving the request from the server.

At 706, method 700 includes establishing a P2P communication link with a requesting peer device. For example, with reference to FIG. 3A, the requesting peer device may include node device 341 or 342. For example, the P2P communication link may include a HTTP connection, such as a HTTP/S.

At 708, method 700 includes receiving, from the requesting peer device, a request for a portion of the file. For example, the request may include or correspond to a peer file request, such as peer file request 390 or peer file request 392. In some implementations, based on receiving the request, the peer device may communicate with the server for authorization to send one or more portions of the file to the requesting peer device and/or to confirm that the requesting device authorized to receive the one or more portions. Based on a determination that the peer device is not authorized to send and/or that the requesting peer device is not authorized to receive, the peer device may discard the request. Alternatively, based on a determination that the peer device is authorized to send and/or that the requesting peer device is authorized to receive, the peer device may proceed with sending the portion.

At 710, method 700 includes transmitting the portion of the file to the requesting peer device. For example, the portion of the file may include to one or more file portions, such as file portion(s) 391 or file portion(s) 393.

Thus, method 700 describes providing P2P downloading. For example, peer devices may communicate to efficiently and securely perform a P2P download of a requested file. By utilizing the P2P download, the requesting peer device may quickly receive one or more portions of a file for use by the requesting peer device.

It is noted that one or more operations (or functions) described with reference to FIGS. 5-7 may be optional or may be omitted. Additionally, or alternatively, it is noted that one or more operations (or functions) described with reference to FIGS. 5-7 may be combined with one or more operations (or functions) of another of figure. For example, one or more operations of FIG. 5 may be combined with one or more operations of another of FIG. 1, 2, 3, 6, or 7. As another example, one or more operations of FIG. 6 may be combined with one or more operations of another of FIG. 1, 2, 3, 5, or 7.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for peer-to-peer (P2P) downloading across a network, the method comprising:
receiving, by a peer device from a server, a signed public key of the peer device, the signed public key of the peer device signed by the server;
sending, from the peer device to the server, a download request based on a download command for a file;
receiving, at the peer device from the server, download information and an indicator, where the download information includes a checksum corresponding to at least a portion of the file, and where the indicator identifies at least one device that stores the portion of the file;
  requesting, by the peer device, the portion of the file from the at least one device using a selected window size that is based on a peer group size of a group of peer devices that store one or more portions of the file; and
  receiving, at the peer device from the at least one device, the portion of the file via encrypted communication with the at least one device using the signed public key of the peer device.

2. The method of claim 1, further comprising:
  sending, from the peer device to the server, downloaded file information indicating that the peer device verified, based on the checksum, receipt of the portion of the file from the at least one device.

3. The method of claim 1, further comprising:
  prior to receiving the signed public key, sending, by the peer device to the server, a public key of the peer device.

4. The method of claim 3, where sending the public key and receiving the signed public key are part of a registration process performed by the peer device with the server, and where the registration process further includes receiving a server public key from the server.

5. The method of claim 1, further comprising:
  sending, from the peer device, a request for the portion of the file to a first device of the at least one device, where the portion of the file is included in a first window having the selected window size; and
  sending, from the peer device, a request for a second portion of the file included in the first window to a second device of the at least one device.

6. The method of claim 1, where the download information includes:
  a corresponding checksum for each portion of the file; and
  a total checksum for the entirety of the file.

7. The method of claim 1, where the file comprises a Docker file.

8. The method of claim 1, further comprising:
  receiving, by the peer device, the download command, the download command comprising a container-layer download command; and
  translating, by the peer device, the container-layer download command to a direct file download request, where the download request sent to the server comprises the direct file download request.

9. The method of claim 1, wherein the indicator comprises a bitset that indicates which portions of the file are at the at least one device.

10. The method of claim 1, further comprising:
  receiving, at the peer device from the server, a token;
  determining, by the peer device, whether the token is valid; and
  based on a determination that the token is expired, sending, from the peer device to the server, a request to renew the token.

11. The method of claim 1, further comprising:
  identifying, by the peer device, the at least one device based on the indicator; and
  establishing, by the peer device and in accordance with an HTTP protocol that is not a binary P2P protocol, a Secure Sockets Layer (SSL)-encrypted communication link to enable P2P communications between the peer device and the at least one device.

12. The method of claim 1, further comprising:
  determining, by the peer device, a number of peer devices with which the peer device has established hypertext communication protocol-based connections;
  comparing the number to a threshold; and
  based on the number being less than or equal to the threshold, sending, from the peer device to the server, a request for the server to identify one or more additional peer devices that store the portion of the file.

13. The method of claim 1, further comprising:
  selecting, by the peer device, the portion to be requested from multiple portions of the file based on an index value corresponding to the portion being lower than index values corresponding to other portions of the multiple portions.

14. The method of claim 1, where the encrypted communication with the at least one device comprises a Secure Sockets Layer (SSL)-encrypted P2P communication in accordance with an HTTP protocol and using the signed public key of the peer device.

15. A system for peer-to-peer (P2P) downloading across a network, the system comprising:
  at least one memory storing instructions; and
  one or more processors coupled to the at least one memory, the one or more processors configured to execute the instructions to cause the processor to:
    receive, from a server, a signed public key, the signed public key signed by the server;
    send, to the server, a download request based on a download command for a file;
    receive, from the server, download information and an indicator, where the download information includes a checksum corresponding to at least a portion of the file, and where the indicator identifies at least one device that stores the portion of the file;
    request the portion of the file from the at least one device using a selected window size that is based on a peer group size of a group of peer devices that store one or more portions of the file; and
    receive, from the at least one device, the portion of the file via encrypted communication with the at least one device using the signed public key.

16. The system of claim 15, where the indicator comprises a bitset that indicates which portions of the file are available from which devices to enable a request for P2P downloading of the file for streaming.

17. The system of claim 15, where the one or more processors are further configured to:
  select the portion to be requested from multiple portions of the file based on a rarity of the portion, the rarity determined based on whether a majority of the at least one device stores the portion.

18. The system of claim 15, where the one or more processors are further configured to:
  verify, based on the checksum, the portion of the file received from the at least one device; and
  send, to the server, downloaded file information indicating that receipt of the portion of the file from the at least one device is verified.

19. The system of claim 15, where the one or more processors are further configured to:
  verify, based on the checksum, the portion of the file received from the at least one device;
  receive one or more remaining portions of the file;
  verify, based on checksums corresponding to the one or more remaining portions of the file, the one or more remaining portions; and verify, based on a total checksum for an entirety of the file, the entirety of the file.

20. The system of claim 15, where the at least one device comprises a first peer device and a second peer device, and where the one or more processors are further configured to:
receive portions of the file from the first peer device, the second peer device, or both.

\* \* \* \* \*

UNITED STATES PATENT AND TRADEMARK OFFICE
CERTIFICATE OF CORRECTION

| | | |
|---|---|---|
| PATENT NO. | : 12,069,127 B2 | Page 1 of 1 |
| APPLICATION NO. | : 18/320520 | |
| DATED | : August 20, 2024 | |
| INVENTOR(S) | : Yoav Landman | |

It is certified that error appears in the above-identified patent and that said Letters Patent is hereby corrected as shown below:

In the Specification

At Column 14, Line number 46, delete "PUP Composer" and replace with --PHP Composer--.
At Column 18, Line number 44, delete "apart" and replace with --a part--.

Signed and Sealed this
Twenty-fourth Day of September, 2024

Katherine Kelly Vidal
*Director of the United States Patent and Trademark Office*